United States Patent
Luk et al.

(10) Patent No.: US 12,311,280 B2
(45) Date of Patent: May 27, 2025

(54) MANUFACTURING PROCESS FOR MAKING TOY FIGURE CLOTHING

(71) Applicant: Hasbro, Inc., Pawtucket, RI (US)

(72) Inventors: Chui Hung Luk, Hong Kong (HK); Sze Wing Ling, Hong Kong (HK)

(73) Assignee: Hasbro, Inc., Pawtucket, RI (US)

( * ) Notice: Subject to any disclaimer, the term of this patent is extended or adjusted under 35 U.S.C. 154(b) by 519 days.

(21) Appl. No.: 17/601,266

(22) PCT Filed: Mar. 30, 2020

(86) PCT No.: PCT/US2020/025659
§ 371 (c)(1),
(2) Date: Oct. 4, 2021

(87) PCT Pub. No.: WO2020/205704
PCT Pub. Date: Oct. 8, 2020

(65) Prior Publication Data
US 2022/0193564 A1    Jun. 23, 2022

Related U.S. Application Data

(60) Provisional application No. 62/829,423, filed on Apr. 4, 2019.

(51) Int. Cl.
*A63H 3/52*     (2022.01)
*B29C 51/02*    (2006.01)
(Continued)

(52) U.S. Cl.
CPC ............... *A63H 3/52* (2013.01); *B29C 51/02* (2013.01); *B29C 51/145* (2013.01);
(Continued)

(58) Field of Classification Search
CPC ....... A41B 1/00; A41B 2400/00; A41B 27/00; A41B 2500/00; A63H 3/52; A63H 9/00
See application file for complete search history.

(56) References Cited

U.S. PATENT DOCUMENTS 4,297,153 A   10/1981  Erickson et al.
4,392,257 A    7/1983  Furga
(Continued)

FOREIGN PATENT DOCUMENTS

CN   104802464 A   7/2015
CN   207477334 U   6/2018
(Continued)

OTHER PUBLICATIONS

Korean International Searching Authority, International Search Report and Written Opinion, counterpart PCT Application No. PCT/US2020/025659, mailed Aug. 7, 2020, 12 pages total.
(Continued)

*Primary Examiner* — John A Ricci
(74) *Attorney, Agent, or Firm* — DiBerardino McGovern IP Group LLC

(57) ABSTRACT

A method of manufacturing a garment includes forming a multilayer composition having one or more design elements. The multilayer composition is formed by applying a material that includes the one or more design elements to an elastomeric polymer base layer. The method further includes heating the multilayer composition, and after the multilayer composition has been heated, then aligning each design element with a respective three-dimensional design feature of a three-dimensional mold, and pressing the heated multilayer composition into the three-dimensional mold. The method further includes cooling the pressed heated multilayer composition to form a three-dimensional molded multilayer composition that includes one or more three-dimensional design elements; and forming a three-dimensional garment from the three-dimensional molded multi-layer composition.

18 Claims, 22 Drawing Sheets

(51) Int. Cl.

| | |
|---|---|
| *B29C 51/14* | (2006.01) |
| *B29C 51/26* | (2006.01) |
| *B32B 7/12* | (2006.01) |
| *B32B 27/12* | (2006.01) |
| *B32B 27/30* | (2006.01) |
| *B29K 23/00* | (2006.01) |
| *B29K 105/08* | (2006.01) |
| *B29L 31/52* | (2006.01) |

(52) U.S. Cl.
CPC ............. *B29C 51/266* (2013.01); *B32B 7/12* (2013.01); *B32B 27/12* (2013.01); *B32B 27/306* (2013.01); *B29K 2023/083* (2013.01); *B29K 2105/0809* (2013.01); *B29K 2995/002* (2013.01); *B29K 2995/007* (2013.01); *B29K 2995/0097* (2013.01); *B29L 2031/5218* (2013.01); *B32B 2307/536* (2013.01); *B32B 2307/732* (2013.01); *B32B 2437/00* (2013.01)

(56) References Cited

U.S. PATENT DOCUMENTS

| | | |
|---|---|---|
| 4,645,629 A | 2/1987 | Stern |
| 4,911,670 A | 3/1990 | McNicholas et al. |
| 4,964,832 A | 10/1990 | Bickoff |
| 5,066,259 A | 11/1991 | Acker |
| 6,000,983 A | 12/1999 | Pressman et al. |
| 6,010,387 A | 1/2000 | Nemec et al. |
| 6,227,930 B1 | 5/2001 | Norman et al. |
| 6,568,986 B2 | 5/2003 | Kobayashi |
| 6,694,872 B1 | 2/2004 | LaBelle et al. |
| 8,333,634 B2 | 12/2012 | Norman et al. |
| 8,387,673 B2 | 3/2013 | Spengler |
| 8,388,406 B2 | 3/2013 | Liu |
| 8,393,932 B1 | 3/2013 | Norman et al. |
| 8,475,905 B2 | 7/2013 | Abrams |
| 8,486,317 B2 | 7/2013 | Warren |
| 9,174,138 B2 | 11/2015 | Norman et al. |
| 9,868,296 B2 | 1/2018 | Davison et al. |
| 2009/0004947 A1 | 1/2009 | Dale et al. |
| 2010/0210171 A1 | 8/2010 | Chan |
| 2015/0210034 A1 | 7/2015 | Tarrier et al. |

FOREIGN PATENT DOCUMENTS

| | | |
|---|---|---|
| JP | S56123815 A | 9/1981 |
| JP | S57099980 A | 6/1982 |
| JP | S63084584 A | 4/1988 |
| KR | 100884829 B1 | 2/2009 |
| KR | 1020170089676 A | 8/2017 |

OTHER PUBLICATIONS

China National Intellectual Property Administration, First Office Action, counterpart Chinese Patent Application No. 202080038661. 7, mailed Jan. 19, 2023, 22 pages total (including English translation of 14 pages).

European Patent Office, Supplementary European Search Report, European counterpart Application No. 20783687.5, mailed Aug. 24, 2023, 6 pages total.

China National Intellectual Property Administration, Second Office Action, counterpart Chinese Patent Application No. 202080038661. 7, mailed Sep. 27, 2023, 28 pages total (including English translation of 17 pages).

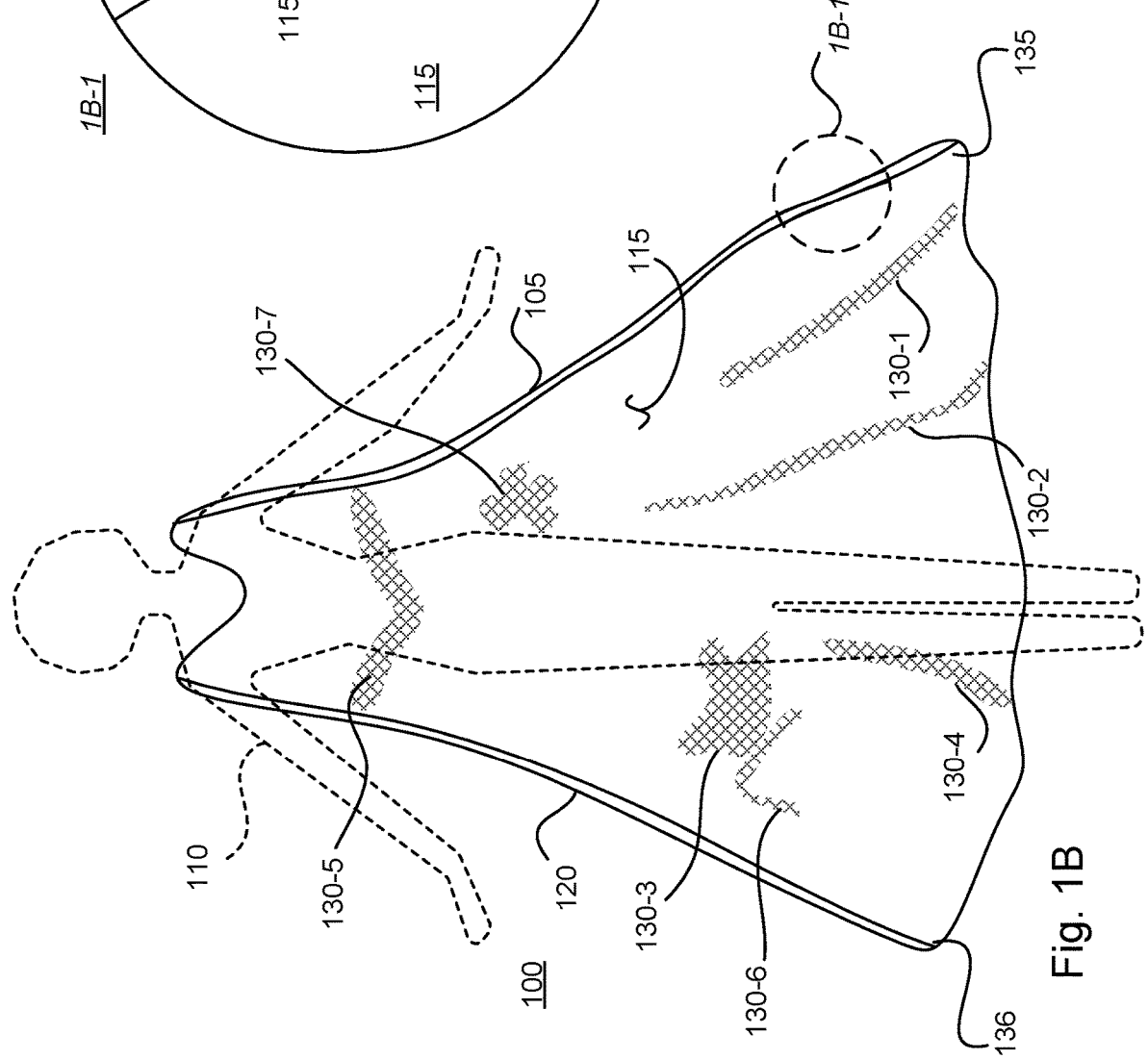
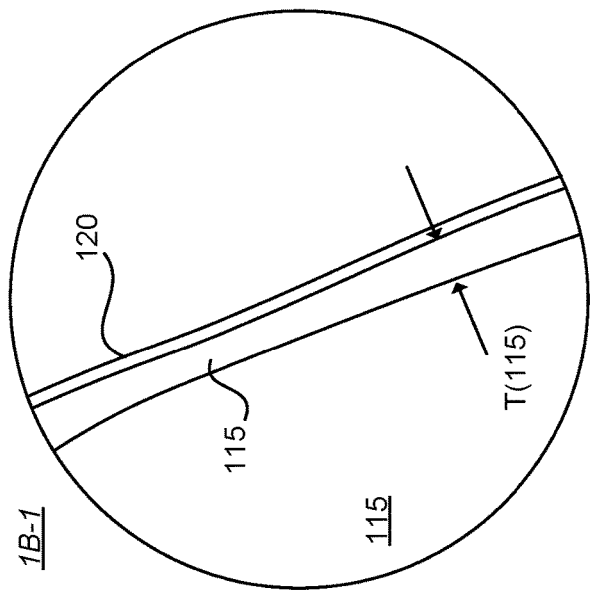
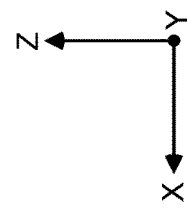
Fig. 1B-1
Fig. 1B

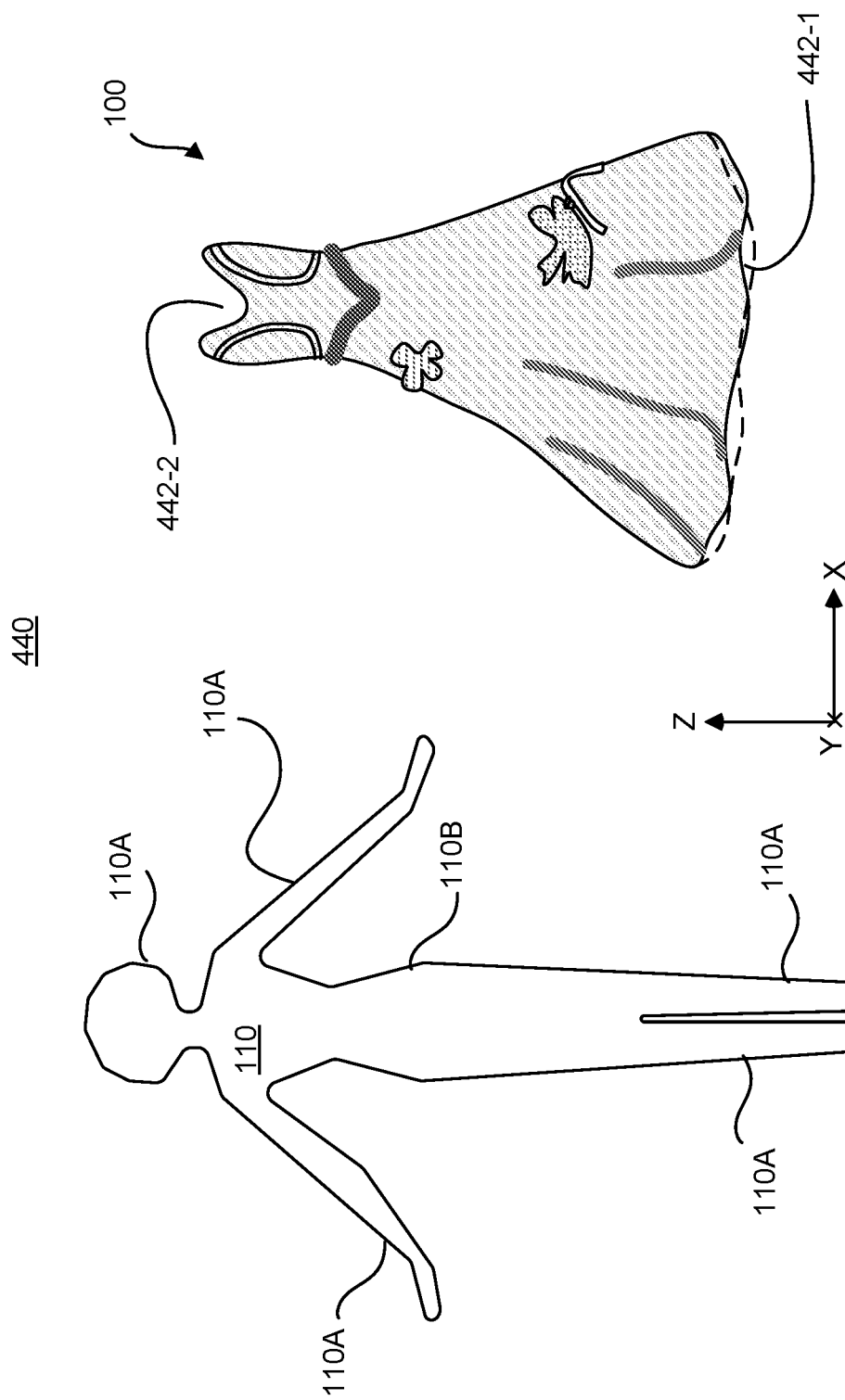

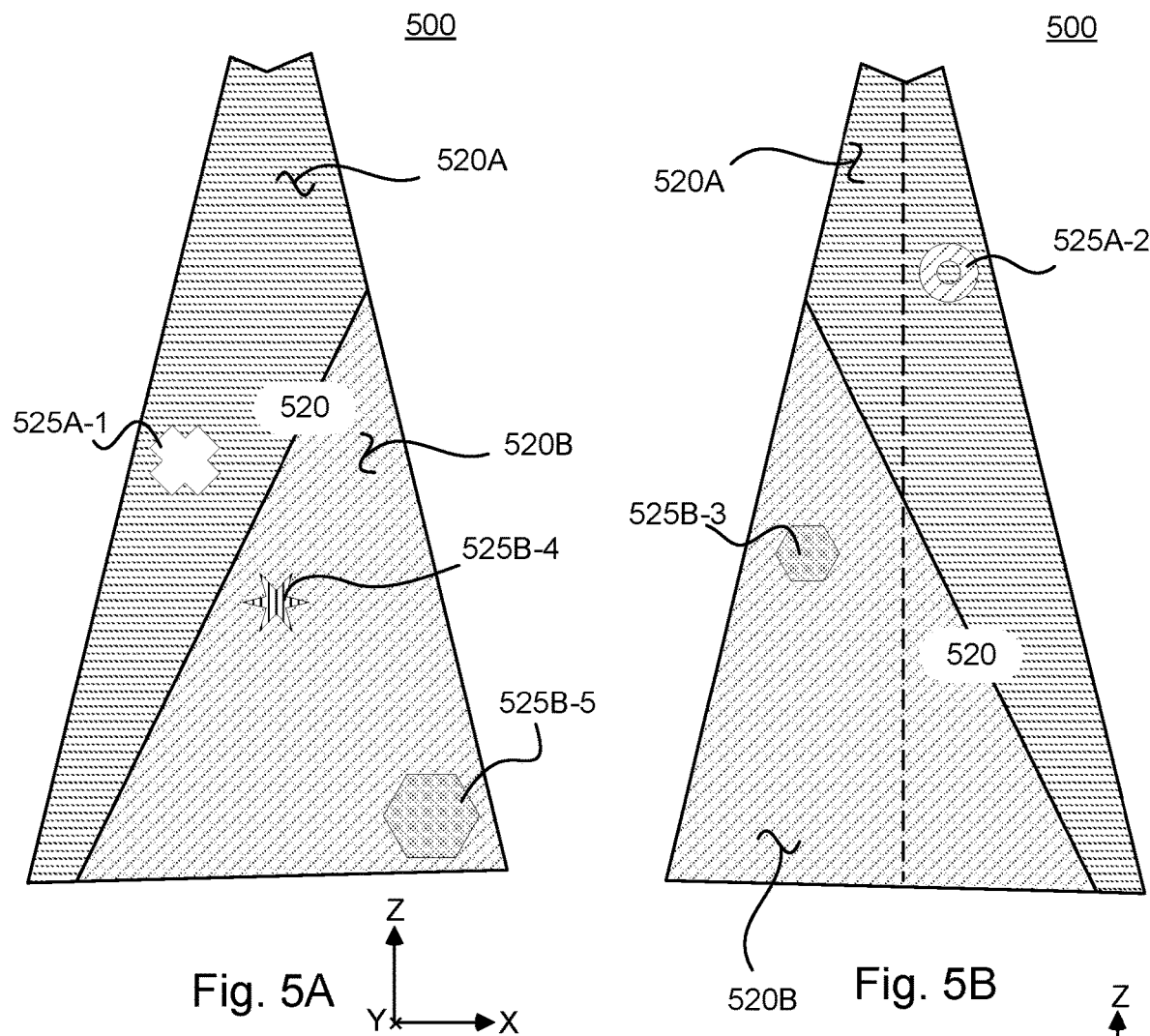
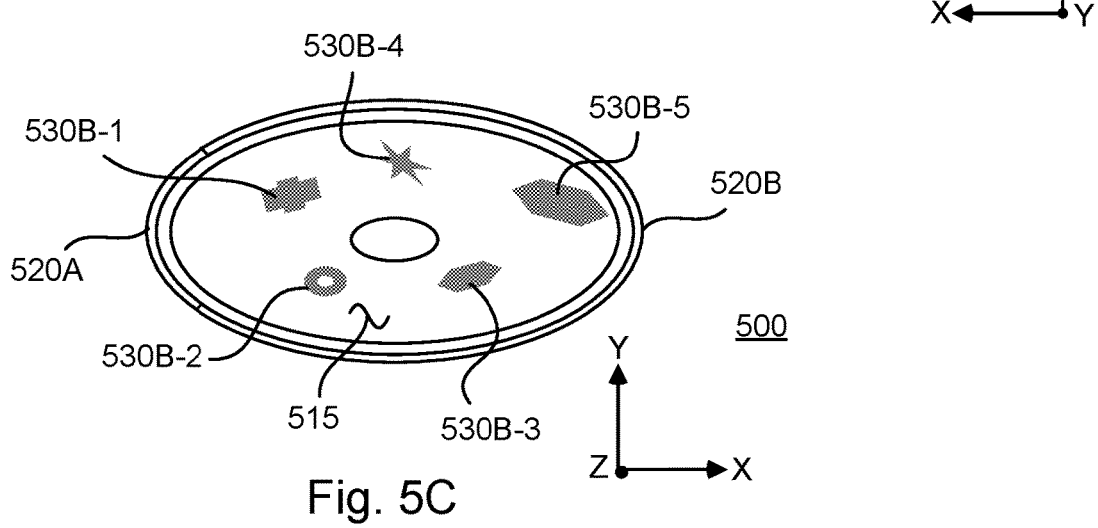
Fig. 5A  Fig. 5B  Fig. 5C

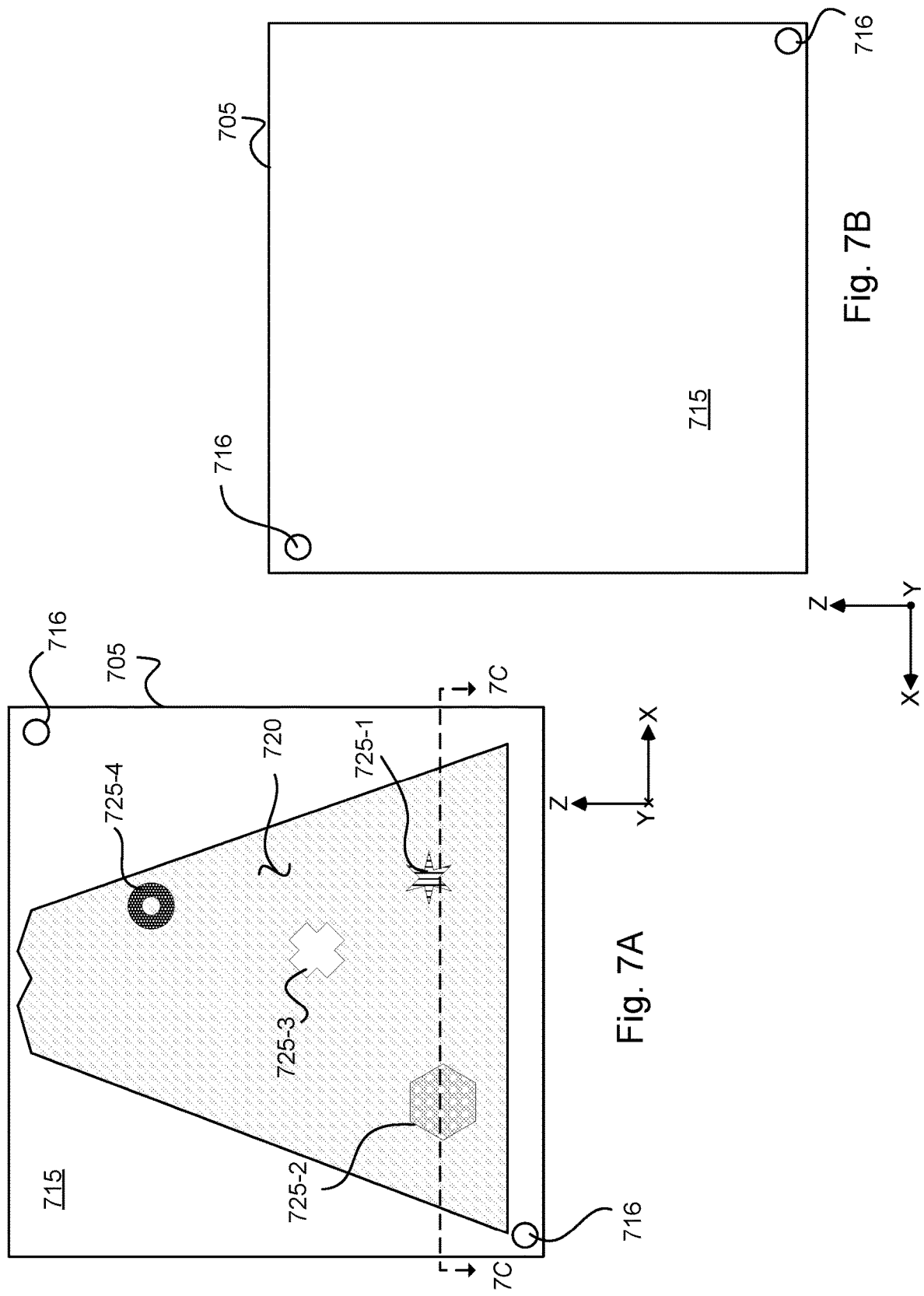

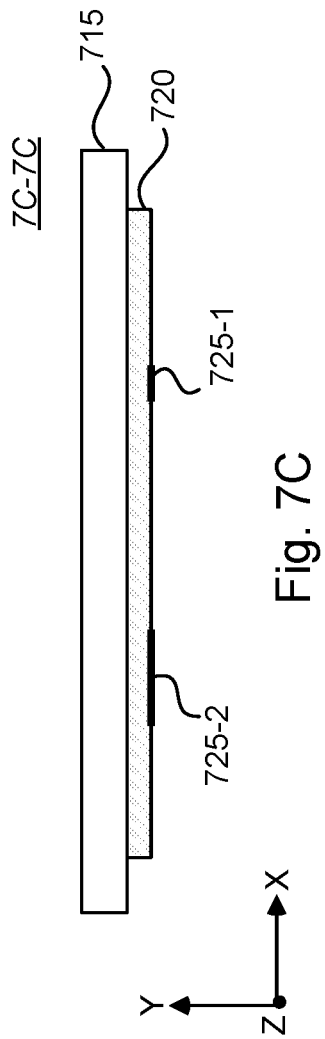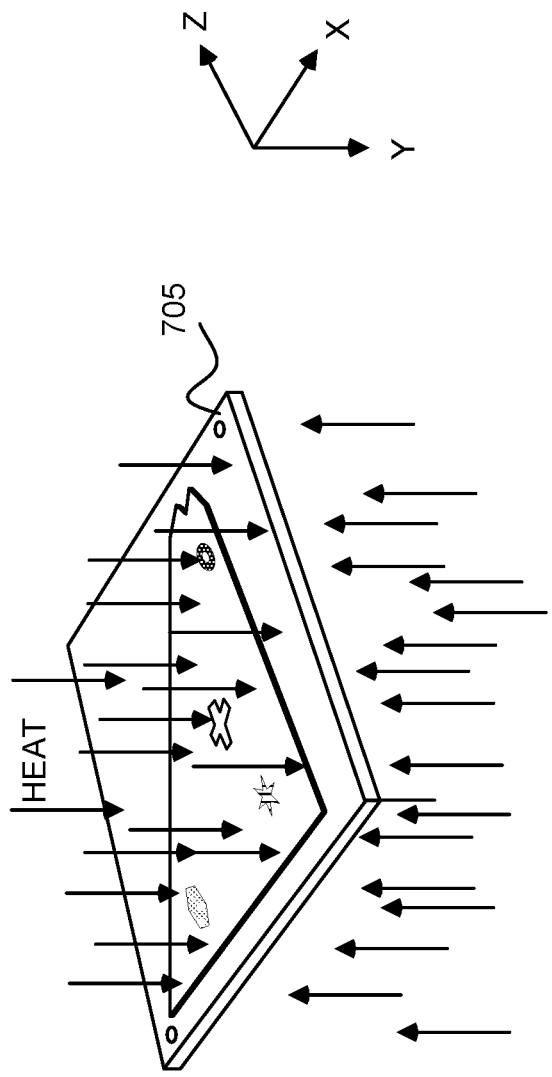

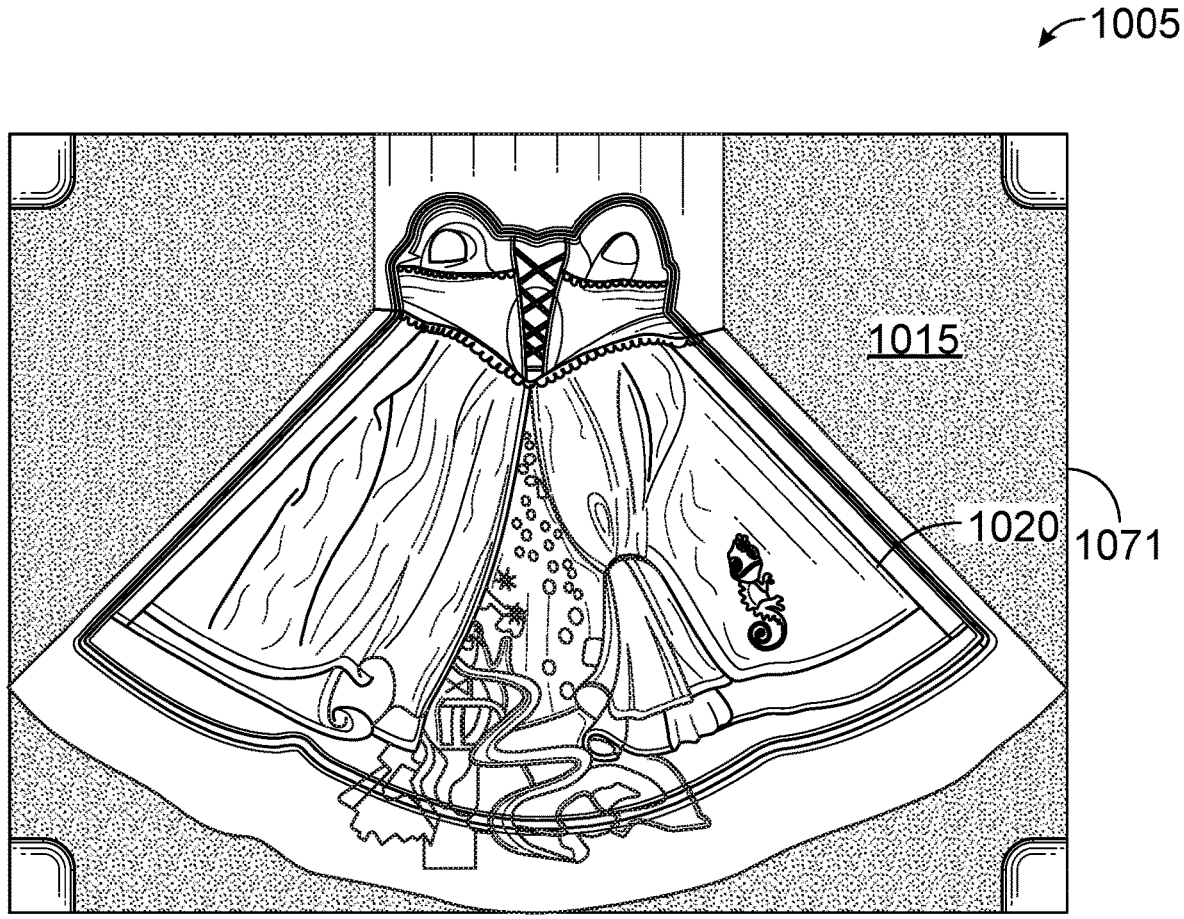
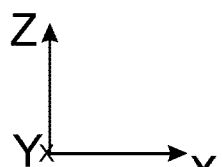
Fig. 10A

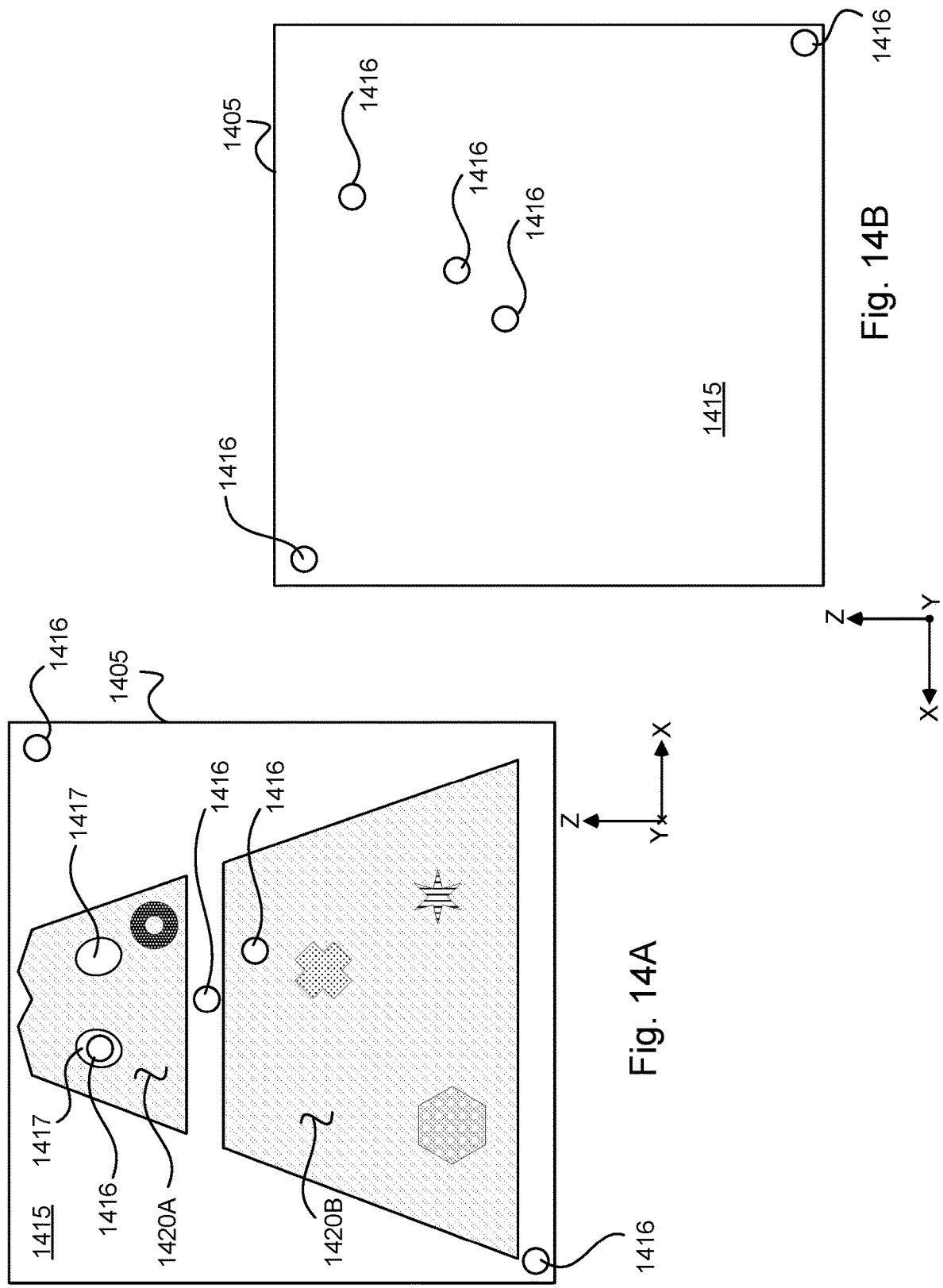

MANUFACTURING PROCESS FOR MAKING TOY FIGURE CLOTHING

CROSS REFERENCE TO RELATED APPLICATION

This application claims the benefit of U.S. Application No. 62/829,423, filed Apr. 4, 2019, and titled MANUFACTURING PROCESS FOR MAKING TOY FIGURE CLOTHING, which is incorporated herein by reference in its entirety.

TECHNICAL FIELD

This disclosure relates to a method of manufacturing clothing for a toy figure such as a doll. The manufacturing method produces a three-dimensional garment that has a full, three-dimensional effect, can stand on its own, and is easy for the user to dress on the toy figure and also to remove from the toy figure.

SUMMARY

In some general aspects, a method of manufacturing a garment includes forming a multilayer composition having one or more design elements. The multilayer composition is formed by applying a material that includes the one or more design elements to an elastomeric polymer base layer. The method further includes heating the multilayer composition, and after the multilayer composition has been heated, then aligning each design element with a respective three-dimensional design feature of a three-dimensional mold, and pressing the heated multilayer composition into the three-dimensional mold. The method further includes cooling the pressed heated multilayer composition to form a three-dimensional molded multilayer composition that includes one or more three-dimensional design elements; and forming a three-dimensional garment from the three-dimensional molded multilayer composition.

Implementations can include one or more of the following features. For example, the material can be applied by attaching a fabric material that includes the one or more design elements to the elastomeric polymer base layer. The fabric material can be attached to the elastomeric polymer base layer by adhering the fabric material to the elastomeric polymer base layer. The fabric material can be adhered to the elastomeric polymer base layer by applying adhesive to the elastomeric polymer base layer, heating the elastomeric polymer base layer with applied adhesive, and pressing the fabric to the heated elastomeric polymer base layer with applied adhesive so that the one or more design elements of the fabric material remain visible after pressing.

The method can also include storing the multilayer composition.

The multilayer composition can be heated by heating the laminated composition to a temperature in a range of 150° C. to 200° C.

Each design element can be aligned with a respective three-dimensional design feature of a three-dimensional mold by fixing at least one reference location on the multilayer composition to a respective mold reference location on the three-dimensional mold. The at least one reference location on the multilayer composition can be fixed to a respective mold reference location on the three-dimensional mold by engaging a first aligner of the multilayer composition with a second complementary aligner formed in a three-dimensional mold plate of the three-dimensional mold. The first aligner can include an opening in the multilayer composition and the second aligner can include a post formed in the three-dimensional mold plate, in which the post is configured in size to be inserted through the opening.

The at least one reference location on the multilayer composition can be fixed to the respective mold reference location on the three-dimensional mold by aligning two or more reference locations on the multilayer composition to respective mold reference locations on the three-dimensional mold.

The heated multilayer composition can be pressed into the three-dimensional mold by placing the heated multilayer composition between complementary three-dimensional mold plates and pressing the complementary three-dimensional mold plates together with the heated multilayer composition positioned between the complementary three-dimensional mold plates. The pressed heated multilayer composition can be cooled by cooling the pressed heated multilayer composition while the multilayer composition is being pressed between the complementary three-dimensional mold plates. The complementary three-dimensional mold plates can be pressed together with the heated multilayer composition positioned between the complementary three-dimensional mold plates by pressing with about 5-15 tons of force for about 10-30 seconds without application of heat.

The three-dimensional garment can be formed from the three-dimensional molded multilayer composition by die cutting the three-dimensional molded multilayer composition. The three-dimensional garment can be formed from the three-dimensional molded multilayer composition by attaching two regions of the three-dimensional garment together to form a cavity configured to receive a toy figure. The two regions of the three-dimensional garment can be attached together to form the cavity by attaching with hook and loop fasteners.

The elastomeric polymer layer can include a copolymer of ethylene and vinyl acetate. The weight percent of vinyl acetate can be between 10-40% of the total.

The elastomeric polymer base layer can have a thickness of between 1.5 and 3.0 millimeters (mm) or a thickness of between 1.5 and 2.5 mm.

The elastomeric polymer base layer can have a hardness of about 30-45 shore.

The material that includes the one or more design elements can be applied to the elastomeric polymer base layer by screen printing the material to the elastomeric polymer base layer so that the one or more design elements are printed along with a base design onto the elastomeric polymer base layer. The material can be screen printed to the elastomeric polymer base layer by pressing ink through a stretched porous fabric mesh onto which a stencil has been applied, and the one or more design elements and the base design are printed based on the stencil.

In other general aspects, a three-dimensional garment for a toy figure includes: a multilayer composition that is shaped into the three-dimensional garment and is able to stand on its own. The multilayer composition includes: an elastomeric polymer base layer; and a print material applied to the elastomeric polymer base layer. The print material includes one or more printed design elements, each printed design element being aligned with a respective three-dimensional design feature of the elastomeric polymer base layer.

Implementations can include one or more of the following features. For example, the multilayer composition can include at least two connection regions at distinct locations for connecting the distinct locations to thereby form the three-dimensional garment that is able to stand on its own.

The elastomeric polymer layer can include a copolymer of ethylene and vinyl acetate. The weight percent of vinyl acetate can be between 10-40% of the total. The elastomeric polymer base layer can have a thickness of between 1.5 and 3.0 millimeters (mm) or between 1.5 and 2.5 mm. The elastomeric polymer base layer can have a hardness of about 30-45 shore.

The multilayer composition can be a laminated composition and the print material can be a fabric material including the one or more printed design elements and being attached to the elastomeric polymer base layer. A thickness of the fabric material can be between 20-35 μm.

The print material can be ink applied to the elastomeric polymer base layer in accordance with a stencil design. A thickness of the applied ink can be between 1-7 μm. The ink can include a plurality of different colors of ink applied to the elastomeric polymer base layer, each ink color applied in accordance with its own stencil design.

In other general aspects, a toy includes: a toy figure; and three-dimensional garment configured to dress the toy figure. The three-dimensional garment includes a multilayer composition that is shaped into the three-dimensional garment and is able to stand on its own. The multilayer composition includes: an elastomeric polymer base layer; and a print material applied to the elastomeric polymer base layer. The print material includes one or more printed design elements, each printed design element being aligned with a respective three-dimensional design feature of the elastomeric polymer base layer.

Implementations can include one or more of the following features. For example, the three-dimensional garment can be made of a single piece and can be configured to wrap around the toy figure.

The toy figure can include a body and one or more appendages extending from the body; and the three-dimensional garment can be made of a single piece and can be configured to wrap around the body of the toy figure.

The toy figure can be able to stand under only the support from the three-dimensional garment when the three-dimensional garment is dressed on the toy figure.

The print material can include a first region that includes a fabric material and can be attached to the elastomeric polymer base layer and a second region that includes ink applied to the elastomeric polymer base layer in accordance with a stencil design. The one or more printed design elements can be in the first region, in the second region, or in both the first region and the second region.

DESCRIPTION OF DRAWINGS

FIG. 1B is a perspective back view of the garment in an open state and showing an enlarged edge view of the multilayer composition;

FIG. 4 is a perspective view of a toy that include the garment of FIG. 1A and a toy figure that can be dressed with the garment;

FIGS. 5A and 5B are front and back views, respectively, of a hybrid print garment that includes a print material made up of a first region including a fabric material attached to a base layer and a second region including an ink applied to the base layer;

FIG. 5C is a cross-sectional view of the hybrid print garment of FIGS. 5A and 5B taken along section C-C;

FIGS. 7A and 7B are front and back views, respectively, of a multilayer composition that includes a print material applied to a base layer before three-dimensional design features are formed in the multilayer composition;

FIG. 7C is a cross-sectional view of the multilayer composition of FIGS. 7A and 7B taken along section C-C;

FIG. 8 is a perspective view of the multilayer composition of FIGS. 7A-7C in which heat is applied to the multilayer composition;

FIGS. 10A and 10B are front and back perspective views of a multilayer composition including ink applied to the base layer, and after being pressed in the mold;

FIGS. 14A and 14B are front and back views of another implementation of the multilayer composition including distinct and disconnected print regions.

DETAILED DESCRIPTION

Figure 1A:
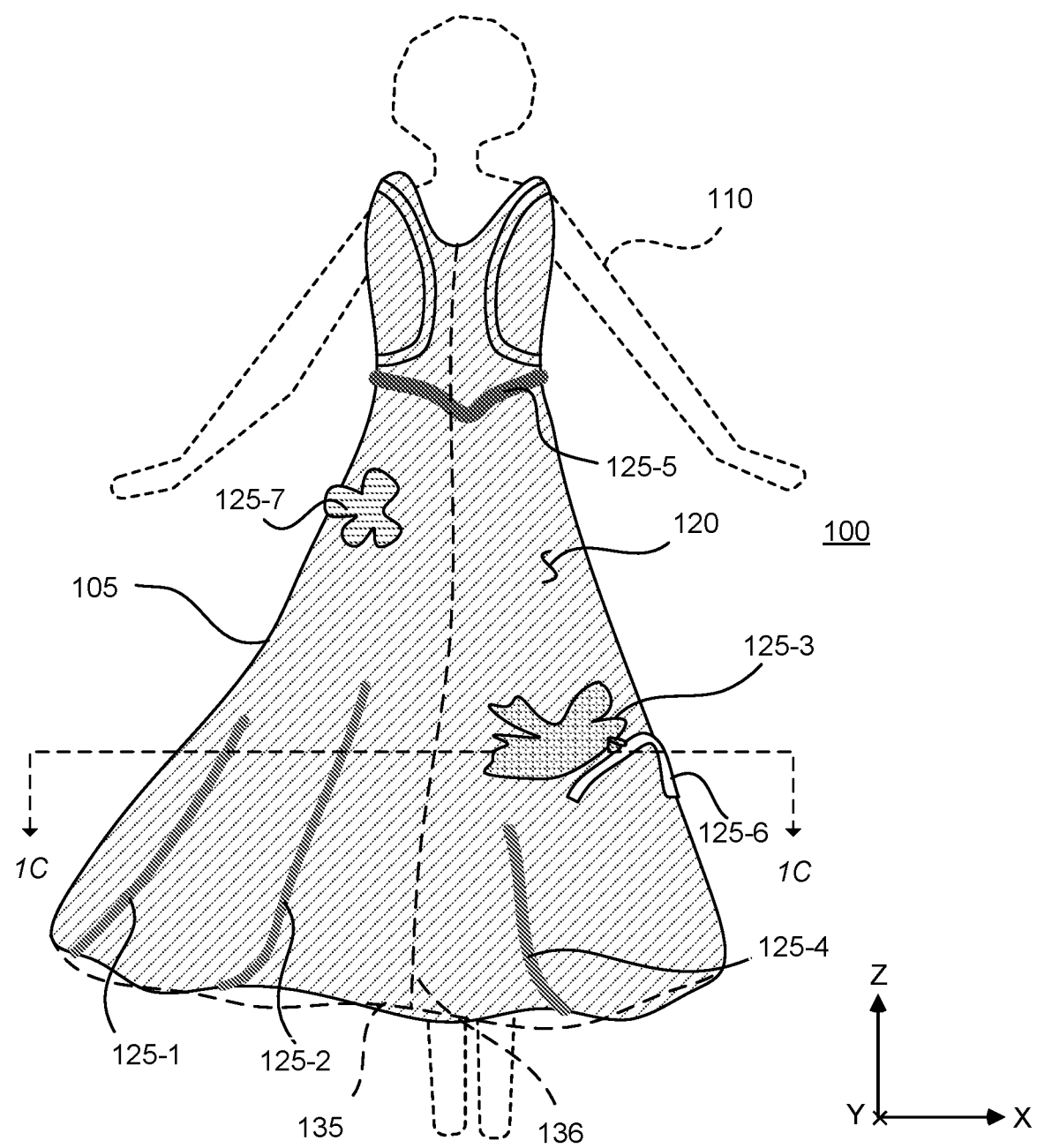
FIG. 1A is a perspective front view of a garment in a closed state, the garment including a multilayer composition that can dress at least part of a toy figure.
Figure 1C:
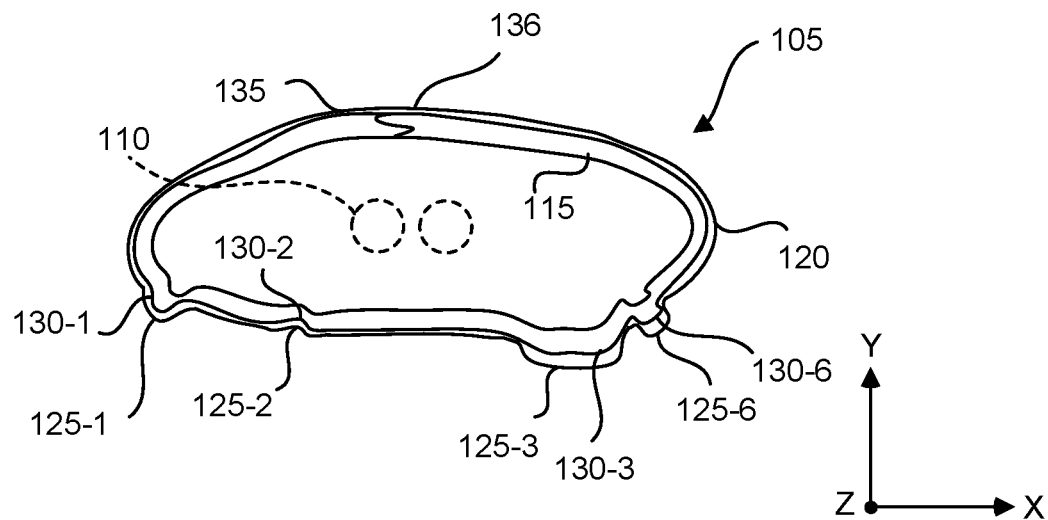
FIG. 1C is a cross-sectional view of the garment in the closed state of FIG. 1A taken along section C-C.

Referring to FIGS. 1A-1D, an implementation of a garment 100 is shown. The garment 100 includes a multilayer composition 105 that is shaped into a three-dimensional form to dress (for example, to fit over, around, or partially around) at least part of a toy figure 110. The multilayer composition 105 is able to stand on its own, that is, without any assistance from the toy figure 110, the user, or any other device. The multilayer composition 105 includes an elastomeric polymer base layer 115 (FIGS. 1B-1D) and a print material 120 applied to the elastomeric polymer base layer 115. The garment 100 is wrapped around the part of the toy figure 110 so that the elastomeric polymer base layer 115 faces the toy figure 110 and the print material 120 is visible to a user and faces away from the toy figure 110.

The multilayer composition 105 includes a first connection region 135 and a second connection region 136. The first and second connection regions 135, 136 are in physical communication with each other in FIGS. 1A and 1C and the garment 100 is in a closed state around the toy figure 110. The print material 120 is visible in FIG. 1A. On the other hand, the first and second connection regions 135, 136 are physically separated from each other in FIGS. 1B and 1D, and the garment 100 is in an open state in FIGS. 1B and 1D. The base layer 115 is visible in FIG. 1B. The first and second connection regions 135, 136 can be fitted with mating connection devices such as hook and loop fasteners.

The print material 120 comprises one or more printed design elements 125-$i$, where $i$ is a positive integer. Each printed design element 125-$i$ is aligned with or in registration with a respective three-dimensional design feature 130-$i$ formed in the elastomeric polymer base layer 115. In the implementation of the garment 100 that is shown in FIGS. 1A-1D, printed design elements 125-1, 125-2, 125-3, 125-4, 125-5, 125-6, and 125-7 are visible in FIG. 1A; and three-dimensional design features 130-1, 130-2, 130-3, 130-4, 130-5, 130-6, and 130-7 are visible in FIG. 1B. Printed design elements 125-1, 125-2, 125-3, and 125-6 and corresponding three-dimensional design features 130-1, 130-2, 130-3, and 130-6 are visible in the cross-sectional view C-C shown in FIG. 1C and also in the cross-sectional and extended view shown in FIG. 1D.

Figure 1D:
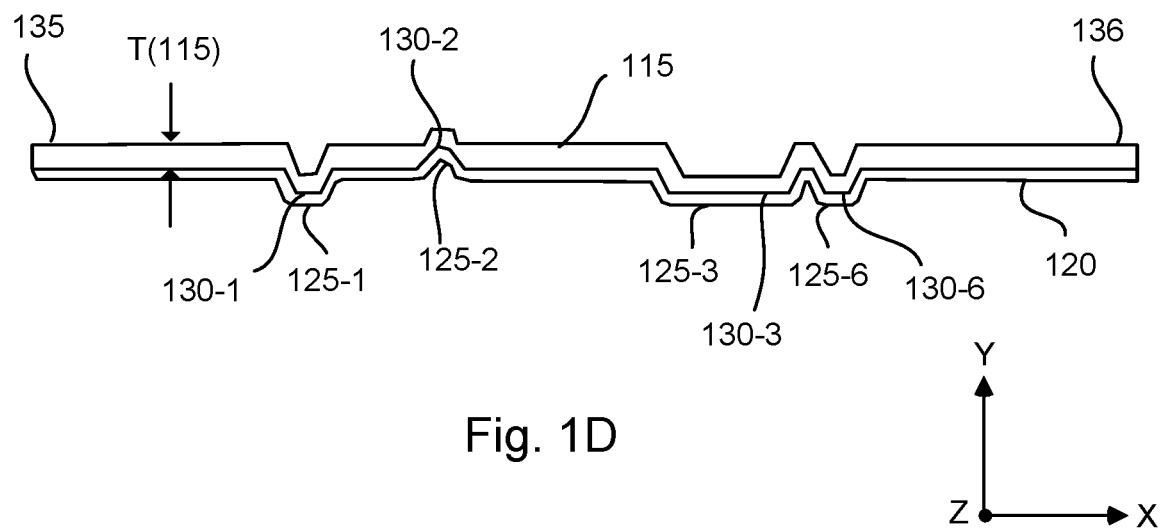
FIG. 1D is a cross-sectional view of the garment of FIG. 1C in an open state.

Each printed design element 125-$i$ is formed as a color or a contrast in color when compared to the print material 120 that is adjacent to that printed design element 125-$i$. For example, each of the printed design elements 125-1, 125-2, 125-4 has a darker color or distinct color or a darker tone from the print material 120 adjacent to that printed design element 125-1, 125-2, 125-4. Moreover, the color or contrast of a particular printed design element 125-$i$ is related to or shaped to conform with the geometry of the underlying three-dimensional design feature 130-$i$. As an example, each of the printed design elements 125-1-7 is in registration with its respective three-dimensional design feature 130-1-7. Each three-dimensional design feature 130-$i$ is a shape formed into the base layer 115 that deviates from a plane or smooth shape. Thus, a design feature 130-$i$ can be a protrusion that extends above the smooth shape of the base layer 115 or a design feature 130-$i$ can be an indentation that presses into the smooth shape of the base layer 115. With reference to FIG. 1D, for example, the design features 130-1, 130-3, and 130-6 are protrusions that extend above a smooth shape of the base layer 115 along the Y direction, while the design feature 130-2 is an indentation that presses into the smooth shape of the base layer 115 along the Y direction, where the general shape or extend of the base layer 115 in the regions outside the design features 130-$i$ is in an XZ plane.

The shape of the printed design element 125-$i$ matches with the shape of the underlying or in-registration design feature 130-$i$. For example, the printed design element 125-3 is shaped like a bird and the underlying design feature 130-3 also has a shape of a bird. As another example, the printed design element 125-6 is shaped like a ribbon and the underlying design feature 130-6 has a shape of a ribbon. As a further example, the printed design element 125-7 is shaped like an abstract flower and the underlying design feature 130-7 has a geometry that also resembles the abstract flower in shape and scale. The printed design elements 125-1, 125-2, and 125-4 are shadows that evoke folds or creases of a dress and the underlying respective design features 130-1, 130-2, 130-4 are either indentations or extensions to mimic the fold or crease of a dress.

The elastomeric polymer base layer 115 can include a copolymer, and the copolymer can be made up of ethylene and vinyl acetate. The weight percent of the vinyl acetate in the copolymer can be between 10-40% of the total. A thickness T(115) of the base layer 115 when taken along the shortest extent can be between about 1.5 to about 3.0 millimeters (mm). In some implementations the thickness T(115) of the base layer 115 is about 1.5 to about 2.5 mm. In order to provide for some amount of rigidness to the garment 100, for example, to enable the garment to stand up without external support, the base layer 115 can have a hardness of about 30-45 shore. The print material 120 also has a thickness T(120) taken along its shortest extent, and this thickness T(120) can depend on the type or composition of the print material 120. For example, the thickness T(120) of the print material 120 is less than the thickness T(115) of the base layer 115 to enable some flexibility in the garment. Thus, in some implementations, the thickness T(120) of the print material 120 can be less than 10% of the thickness T(115) of the base layer 115. In some implementations, the thickness T(120) of the print material 120 can be less than 1% of the thickness T(115) of the base layer 115.

In some implementations, the multilayer composition 105 is a laminated composition, which means that it includes superposed layers of one or more materials that are united by an adhesive or other suitable method. For example, the multilayer composition 105 includes the elastomeric polymer base layer 115 and the print material 120 is a fabric material on which the one or more printed design elements are presented. In this example, the fabric material is applied (for example, by adhesion) to the elastomeric polymer base layer 115.

Figure 2A:
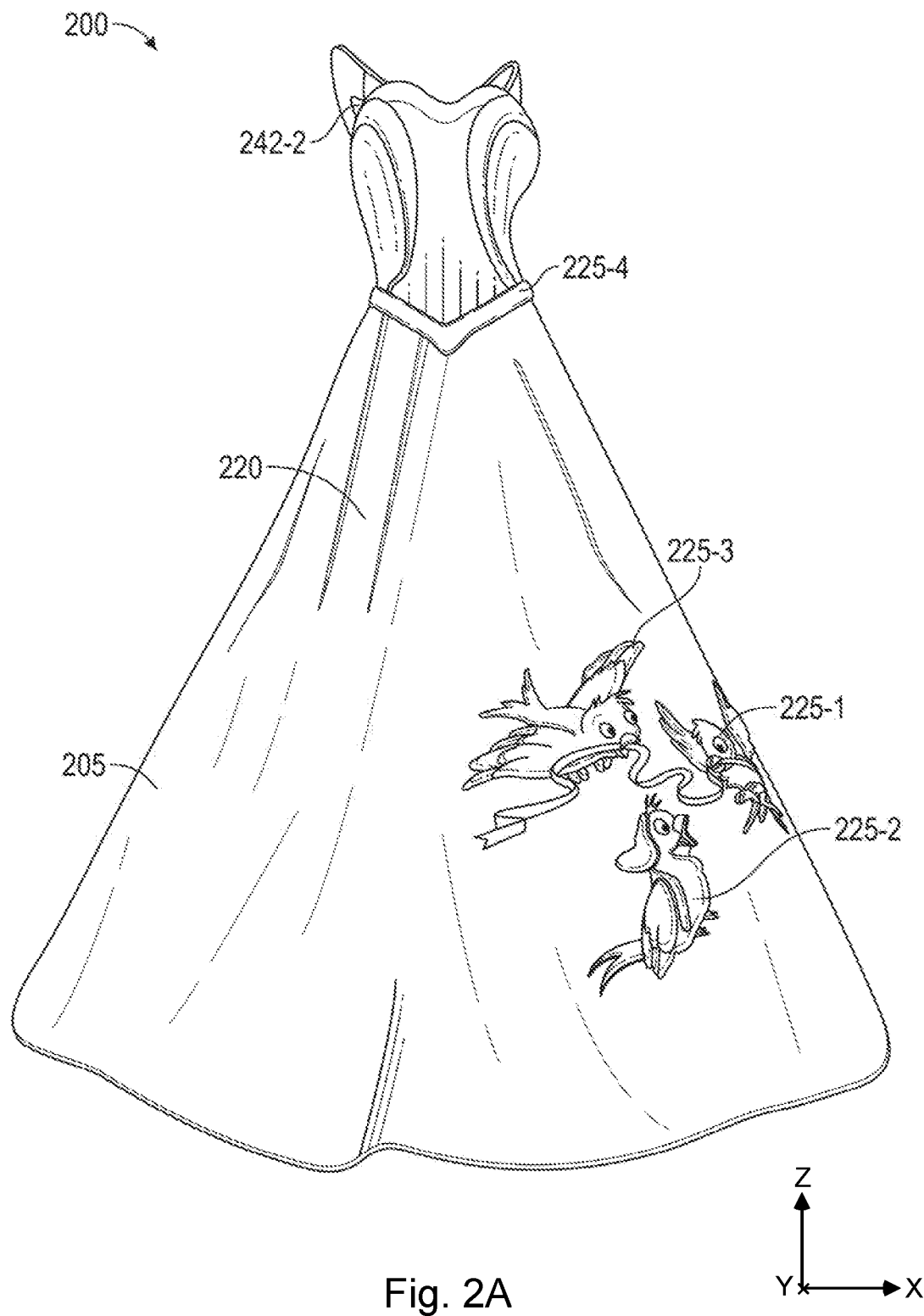
FIGS. 2A and 2B are front and back perspective views, respectively, of an implementation of the garment of FIG. 1A in which the multilayer composition includes fabric applied to a base layer.
Figure 2B:
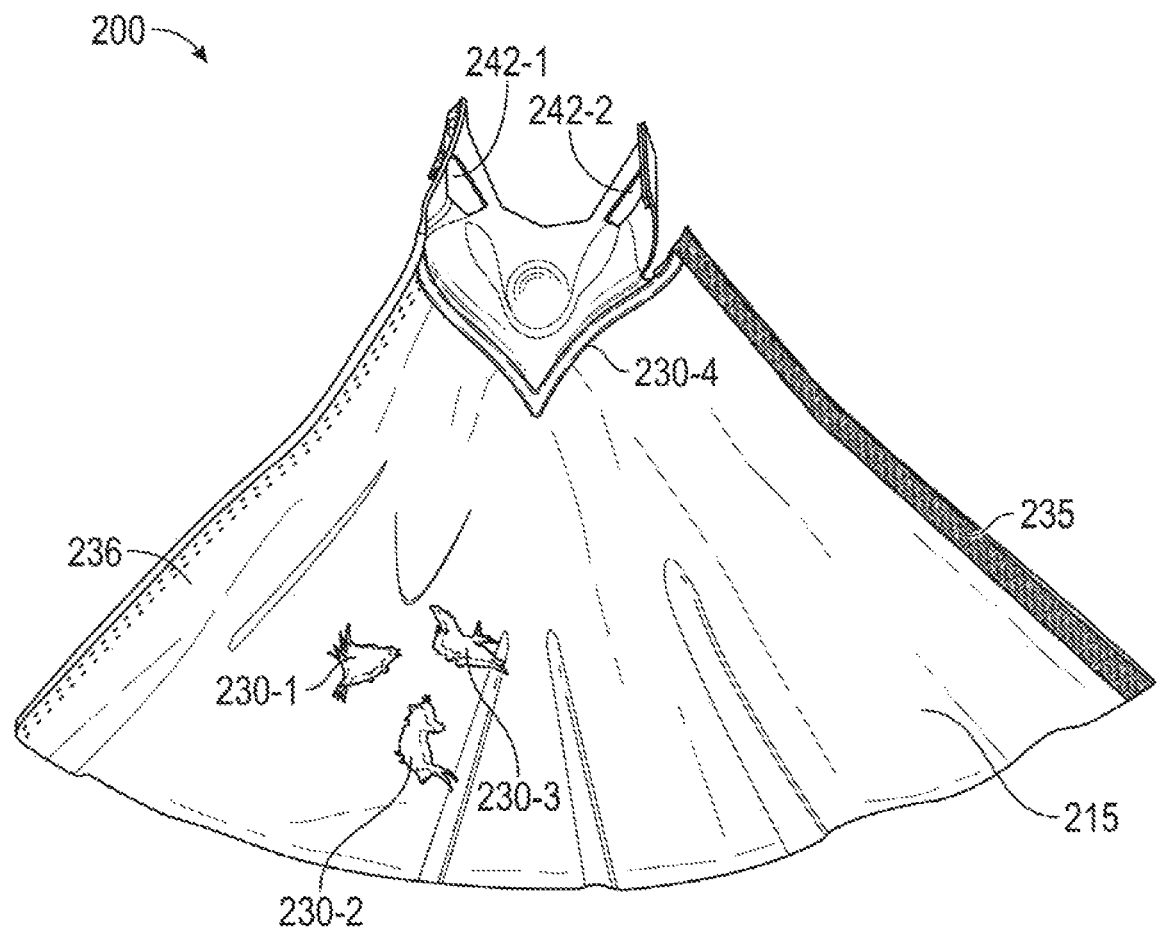

FIGS. 2A and 2B show front (2A) and back (2B) views of an implementation of a garment 200 that includes a laminated multilayer composition 205. The multilayer composition 205 includes a print material 220 that is a fabric material applied to an elastomeric polymer base layer 215. The fabric material 220 includes a set of printed design elements 225-1, 225-2, 225-3, 225-4 (2A) in registration with underlying design features 230-1, 230-2, 230-3, 230-4 (2B). The fabric material 220 can have a thickness T(120) that is about 1% of the thickness T(115) of the base layer 215. For example, the thickness T(120) of the fabric material 220 can be between about 20 micrometers (m) and about 35 μm.

The fabric material 220 can be a stretchy fabric such as, for example, Spandex, knit, or pique knit fabric.

In other implementations, the print material 120 is an ink applied to the elastomeric polymer base layer 115. For example, the ink can be applied using a silkscreen printing technique, as discussed below. The ink can include a plurality of different colors, and the colors can be overlaid onto the base layer 115, laid adjacently to each other, or laid separated from each other onto the base layer 115, depending on the design. In this case, the ink is applied in accordance with one or more stencil designs, each stencil design corresponding to a particular color. In some implementations, the ink is a water-based ink. In other implementations, the ink is an oil-based silkscreen ink. For example, an oil-based silkscreen ink applied onto EVA foam as the base layer 115 can avoid or reduce cracking in the print material 120.

Figure 3A:
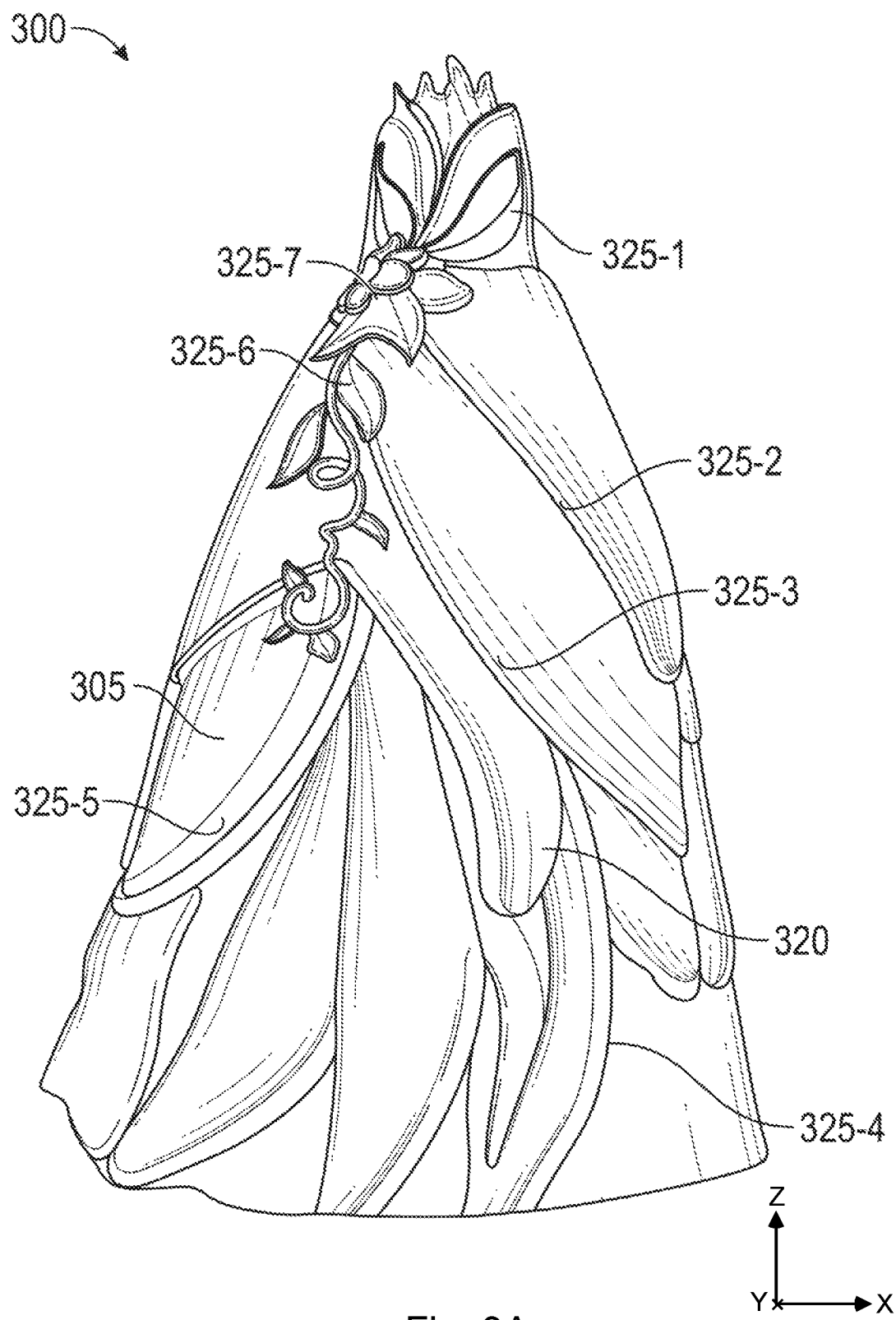
FIGS. 3A and 3B are front and back perspective views, respectively, of an implementation of the garment of FIG. 1A in which the multilayer composition includes ink applied to a base layer.
Figure 3B:
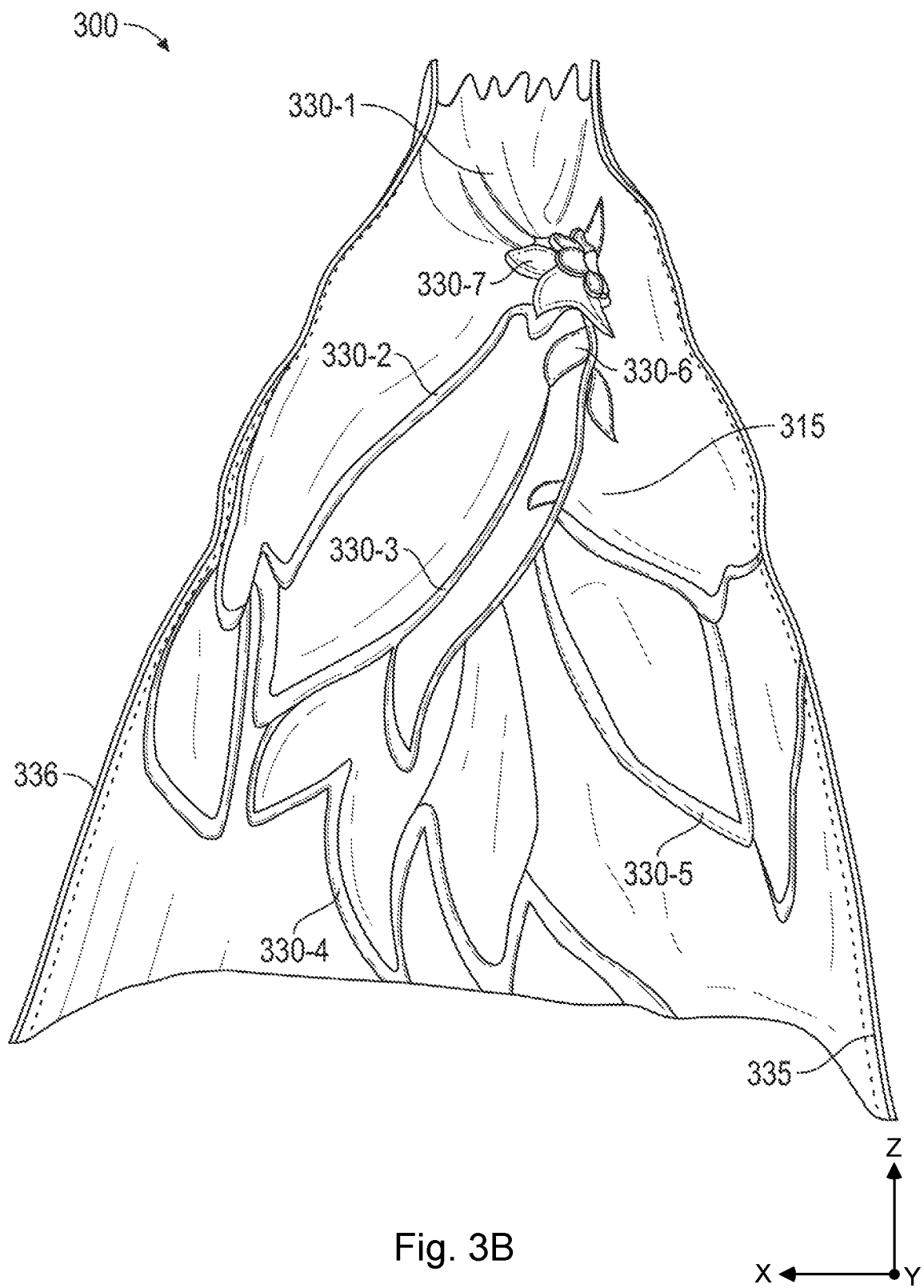

FIGS. 3A and 3B show front (3A) and back (3B) views of an implementation of a garment 300 having a multilayer composition 305 in which a print material 320 is ink and the ink is applied to an elastomeric polymer base layer 315. The applied ink 320 includes a set of printed design elements 325-1, 325-2, 325-3, 325-4, 325-5, 325-6, 325-7 (3A) in registration with underlying design features 330-1, 330-2, 330-3, 330-4, 330-5, 330-6, 330-7 (3B). The applied ink 320 can have a thickness T(120) that is on the order of about 0.1% of the thickness T(115) of the base layer 315. For example, the thickness T(120) of the applied ink 320 can be between about 1 μm and about 7 μm.

Referring to FIG. 4, a toy 440 can include both the toy figure 110 and the garment 100. The garment 100 is a single piece and is configured to wrap around the toy figure 110. The toy figure 110 includes a body 110B and one or more appendages 110A. Thus, the garment 100 is configured to wrap around the body 110B of the toy figure 110. The garment 100 can include one or more openings that enable one or more of the appendages 110A to pass unimpeded, and without limiting movement of the appendages 110A. For example, openings 242-1, 242-2 are formed near a side and top region of the garment 200 for enabling arm appendages of the toy figure 110 to pass through the garment 200. As another example, the bottom of the garment 100 can form a large opening 442-1 that permits leg appendages of the toy figure 110 to move and the top of the garment 100 can form a small opening 442-2 that receives a head or a neck appendage of the toy figure 110.

Referring to FIGS. 5A-5C, in some implementations, the garment 100 is a hybrid print garment 500. The hybrid print garment 500 includes a print material 520 that is made up of a plurality of regions. In this implementation, the print material 520 includes a first region 520A that includes a fabric material attached to an elastomeric polymer base layer 515 and a second region 520B that includes an ink applied to the elastomeric polymer base layer 515. The first region 520A can include one or more printed design elements 525A-i (such as printed design elements 525A-1 and 525A-2) and one or more of the printed design elements 525A-i can be on a back side of the garment 500 (as shown in FIG. 5B). The second region 520B can include one or more printed design elements 525B-k (such as printed design elements 525B-3, 525B-4, 525B-5) and at least one of the printed design elements 525B-k can be on the back side of the garment 500 (as shown in FIG. 5B), where k is a positive integer greater than i. Each of the printed design elements 525A-i, 525B-k is in registration with a three-dimensional design feature 530-j formed in the base layer 515 (where j is the integer i or k). Thus, in this implementations, the three-dimensional design features 530-1, 530-2 are in registration with the printed design elements 525A-1, 525A-2, respectively, of the first region 520A of the print material 520 and the three-dimensional design features 530-3, 530-4, 530-5 are in registration with the printed design elements 525B-3, 525B-4, 525B-5, respectively, of the second region 520B of the print material 520.

Figure 6:
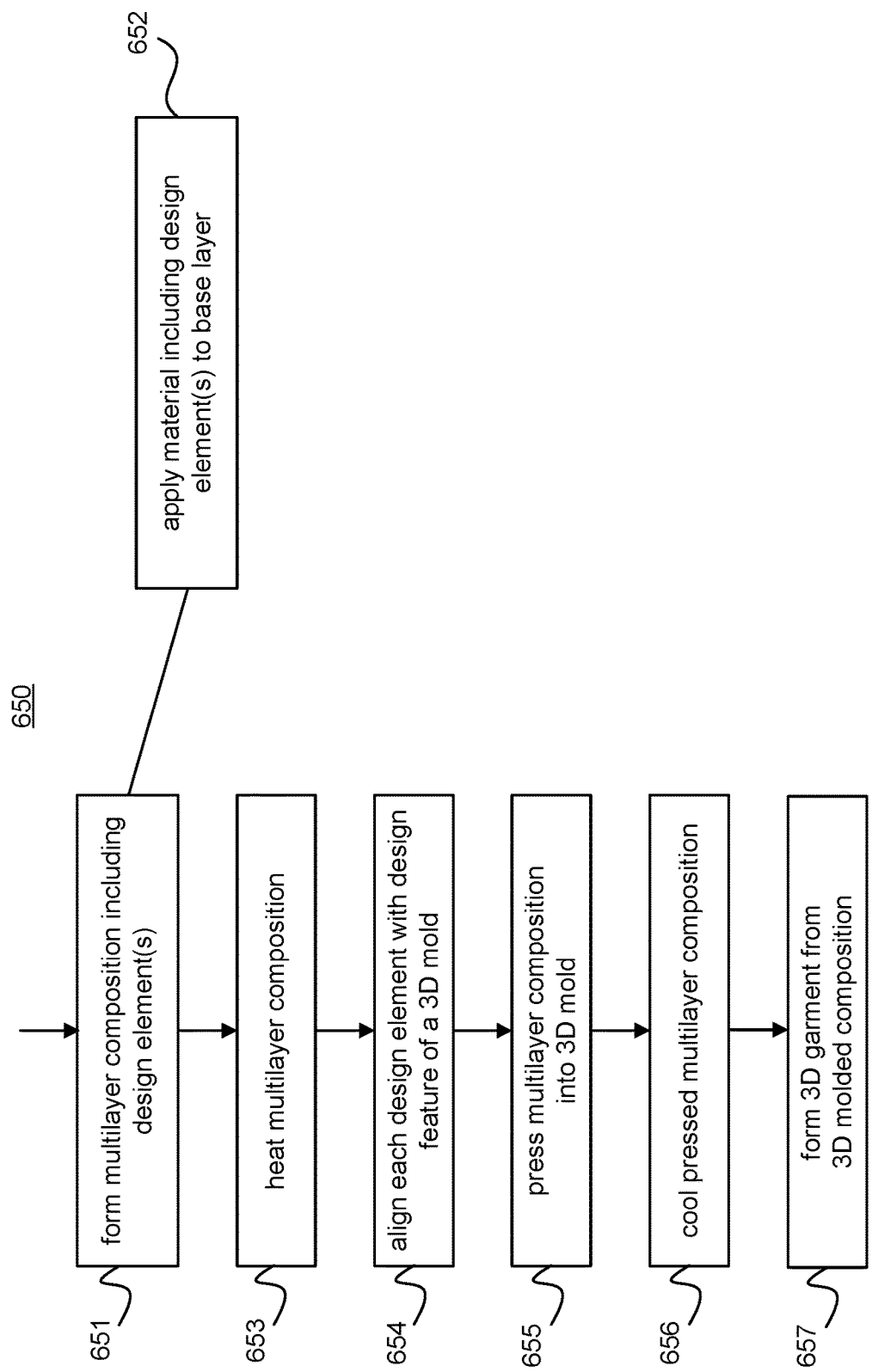
FIG. 6 is a flow chart of a procedure for manufacturing the garment of FIGS. 1A-5C.

Referring to FIG. 6, a procedure 650 is performed for manufacturing a garment such as the garment 100, 200, 300, 500. Reference is made to FIGS. 7A-11C when describing the procedure 650. The procedure 650 includes forming a multilayer composition 705 having one or more design elements 725-i (651). The multilayer composition 705 is formed by applying a print material 720, which includes the one or more design elements 725-i to an elastomeric polymer base layer 715 (652). For example, the design elements 725-i include design element 725-1 (in the shape of a star), design element 725-2 (in the shape of a hexagon), design element 725-3 (in the shape of a cross, and design element 725-4 (in the shape of a donut).

At this stage in the procedure 650, the base layer 715 extends beyond the print material 720; to put it another way, the print material 720 is applied to a portion of the base layer 715. The reason for this is to enable further processing of the multilayer composition 705 before final formation into the garment. For example, the base layer 715, at the regions that lack the print material 720, includes one or more reference locations 716. These reference locations 716 can be used during the procedure 650 to align the print material 720 with a three-dimensional mold. Additionally, at this stage of the procedure 650, the base layer 715 does not yet include any three-dimensional design features 730-i and thus is relatively flat (extending in the XZ plane as shown in FIGS. 7A-7C.

Examples or implementations of how the print material 120 is applied to the base layer 115 (652) are discussed below with reference to FIGS. 12A, 12B, 13A, and 13B.

Once the multilayer composition 705 is formed (651), then the multilayer composition 705 is heated (653), as shown in FIG. 8. The multilayer composition 705 is heated (653) to soften the composition 705 to enable it to be deformed in three dimensions (for example, also along the Y axis of the multilayer composition 705 during the next step). For example, the multilayer composition 705 can be heated (653) to a temperature in the range of 150° C.-200° C. by inserting the multilayer composition 705 into an oven.

Figure 9A:
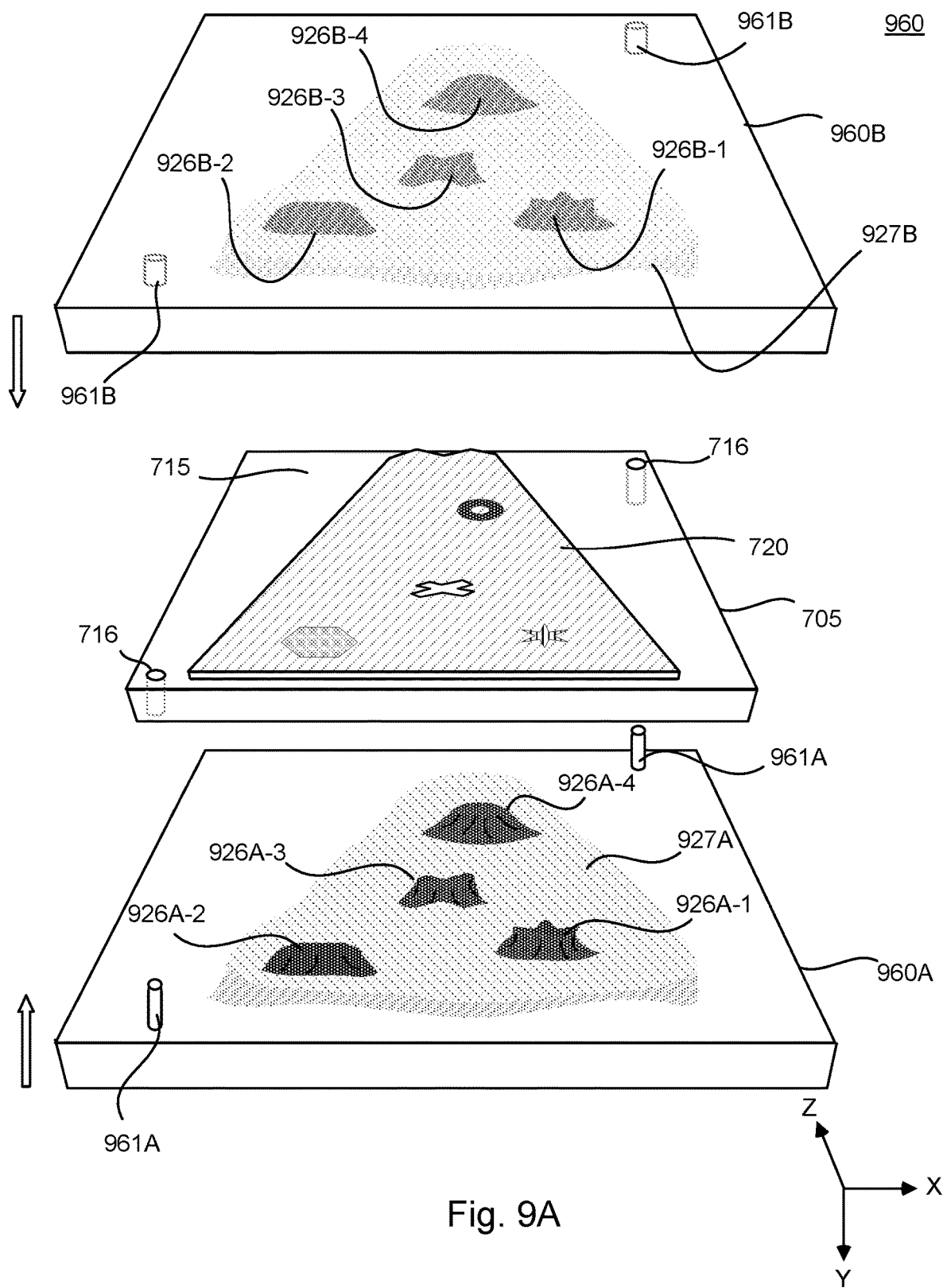
FIG. 9A is a perspective view of a mold in which the multilayer composition of FIGS. 7A-7C has been aligned, the mold including a pair of mold components.
Figure 9B:
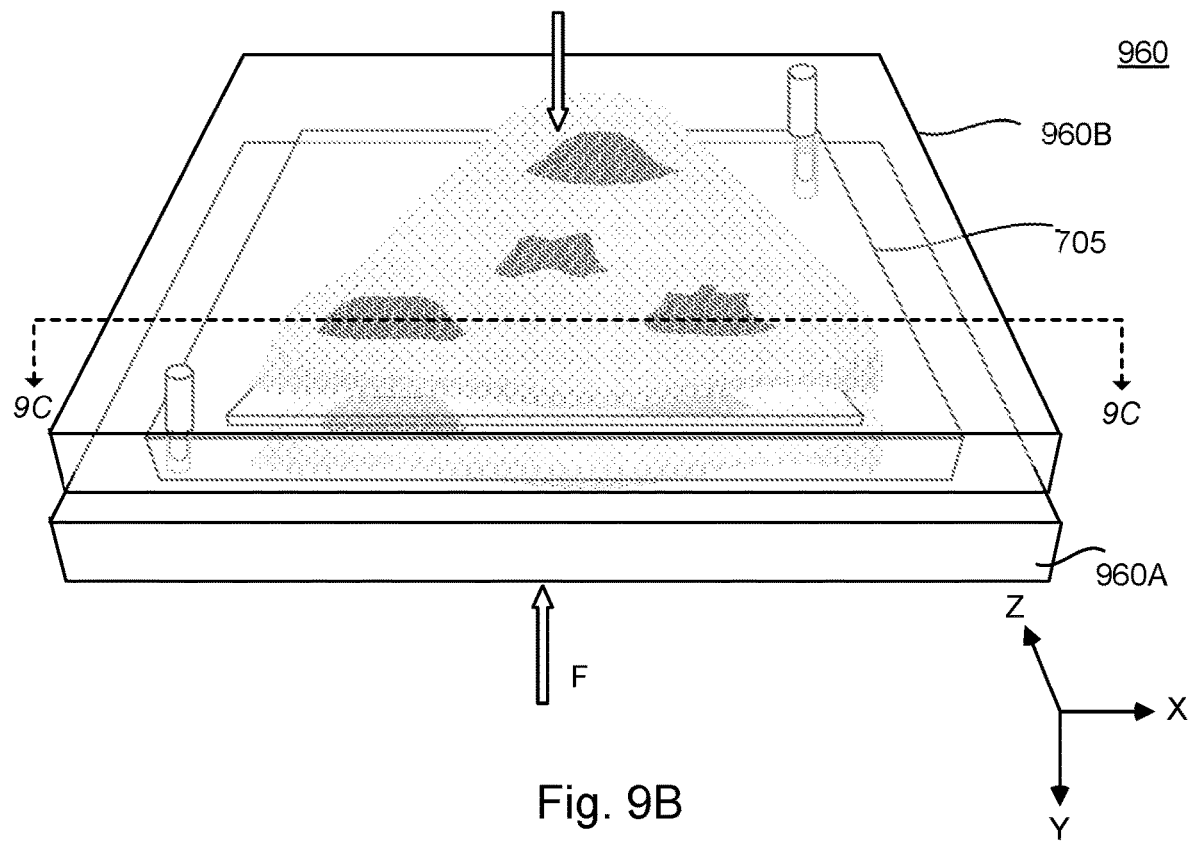
FIG. 9B is a perspective view of the multilayer composition pressed between the mold components of the mold of FIG. 9A.
Figure 9C:
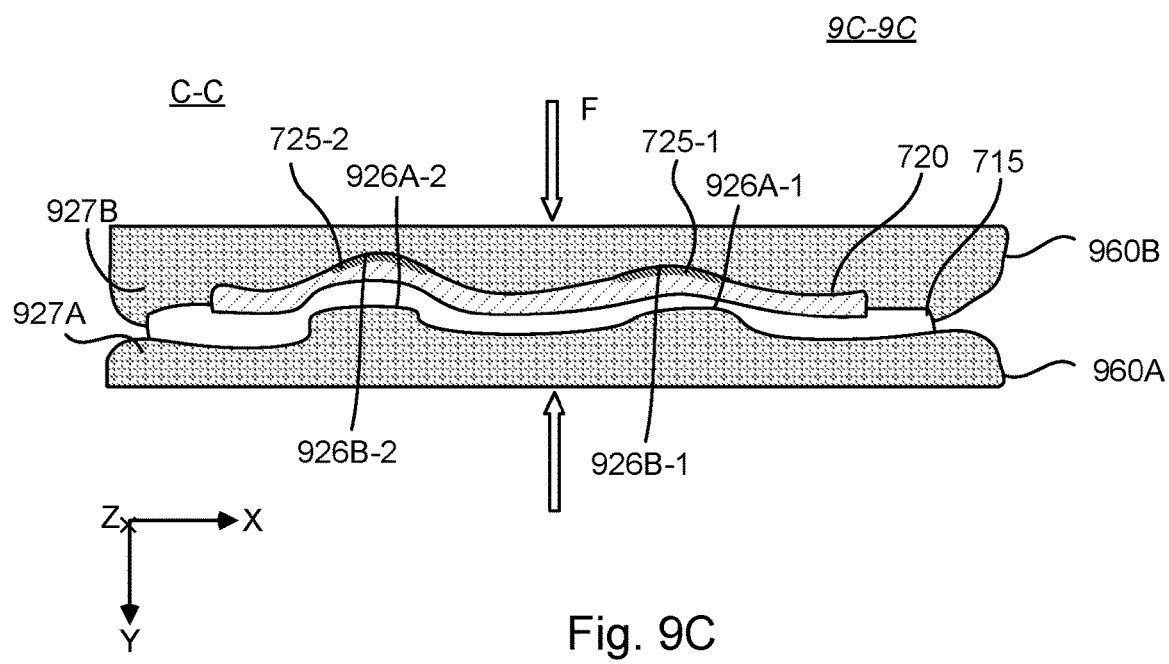
FIG. 9C is a side cross-sectional view of the multilayer composition pressed between the mold components of the mold of FIGS. 9A and 9B taken along section C-C.

Referring to FIGS. 9A-9C, after the multilayer composition 705 has been heated (653), and is therefore softened, then each design element 725-i is aligned with a respective three-dimensional design feature 926-i of a three-dimensional mold 960 (654). The three-dimensional mold 960 includes a pair of mold components 960A, 960B, with each mold component 960A, 960B including aligned and complementarily-shaped three-dimensional design features 926A-i, 926B-i. Each design feature 926A-i, 926B-i is a shape that extends not only in the XZ plane but also along the Y axis. Additionally, each of the design features 926A-i, 926B-i can be formed on a three-dimensional mold form 927A, 927B that also extends along the Y axis. Each three-dimensional design feature 926-i is shaped to complement the design element 725-i in registration with that design feature 926-i (along the XZ plane).

The design elements 725-i can be aligned with their respective design feature 926-i (654) by fixing each reference location 716 of the multilayer composition 705 with a respective mold reference location 961A, 961B on each of the mold components 960A, 960B, respectively, of the three-dimensional mold 960. Each of the reference locations 716 can be openings or holes formed in the base layer 115; each of the reference locations 961B can be openings that align with the reference locations 716; and each of the reference locations 961A can be posts that are configured to fit into respective holes 716 and openings 961B.

Referring to FIGS. 9B and 9C, after the design elements 725-*i* are properly aligned with their respective design features 926-*i* (654), the heated multilayer composition 705 is pressed into the three-dimensional mold 960 (655) by, for example, pressing the mold components 960A, 960B together (such that the multilayer composition 705 is between the mold components 960A, 960B). The mold components 960A, 960B can be pressed together with about 5-15 tons of force F for about 10-30 seconds and without any additional application of heat.

The pressed pre-heated multilayer composition 705 is cooled (656) to form a three-dimensional molded multilayer composition that includes one or more three-dimensional design elements 725-*i*. The cooling (656) can occur while the multilayer composition 705 is being pressed (655). For example, because no additional heat is applied while the multilayer composition 705 is pressed (655), the multilayer composition 705 can cool naturally (without any additional cooling mechanism).

After the multilayer composition 705 has cooled enough (656), then the multilayer composition 705 (which includes the three-dimensional design elements 725-*i*) is formed into a three-dimensional garment (657).

Figure 10B:
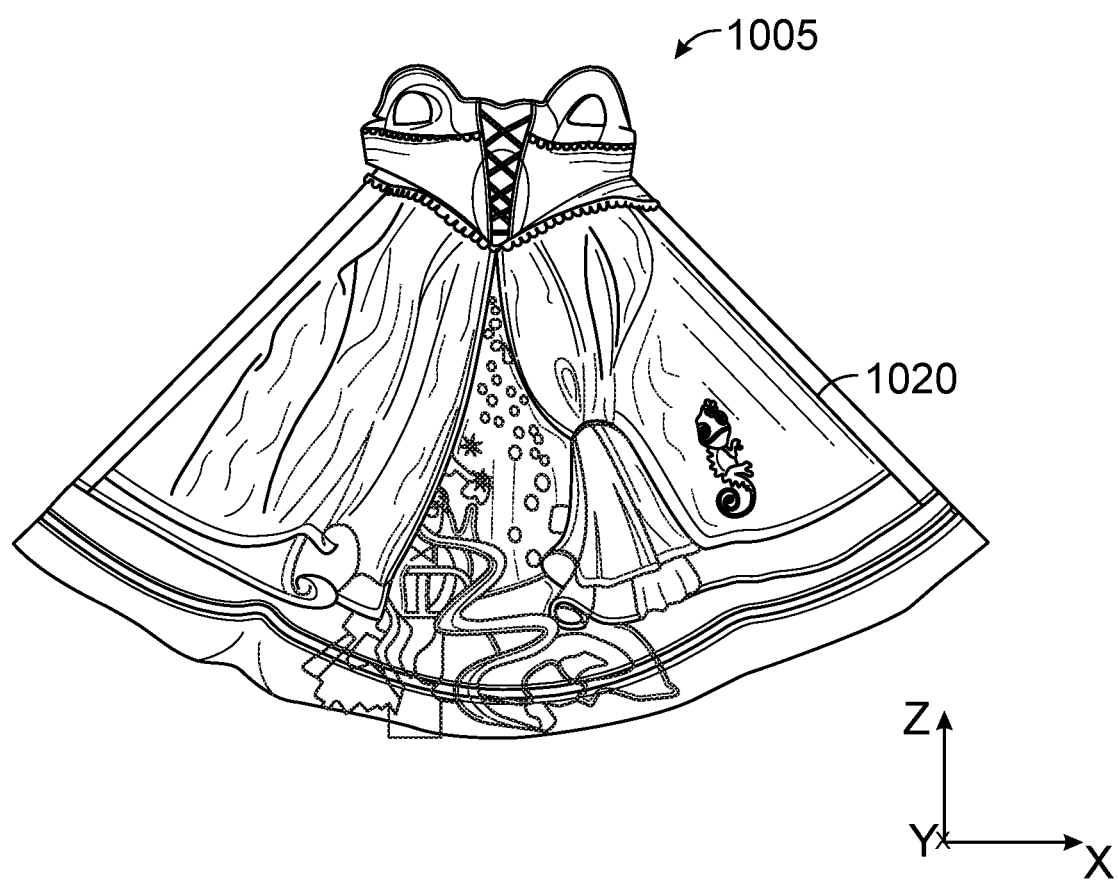

For example, with reference to FIGS. 10A and 10B, a cooled multilayer composition 1005 in which the print material 1020 is formed as an ink applied to an elastomeric polymer base layer 1015 and has been processed using the procedure 650 is cut (for example, die cut) into the shape of the garment, and in this step the die cutting can also separate a portion 1071 of the elastomeric polymer base layer 1015 that lacks any print material 1020. After die-cutting, the multilayer composition 1005 takes the shape of the garment including print material 1020 over the base layer 1015.

Figure 11A:
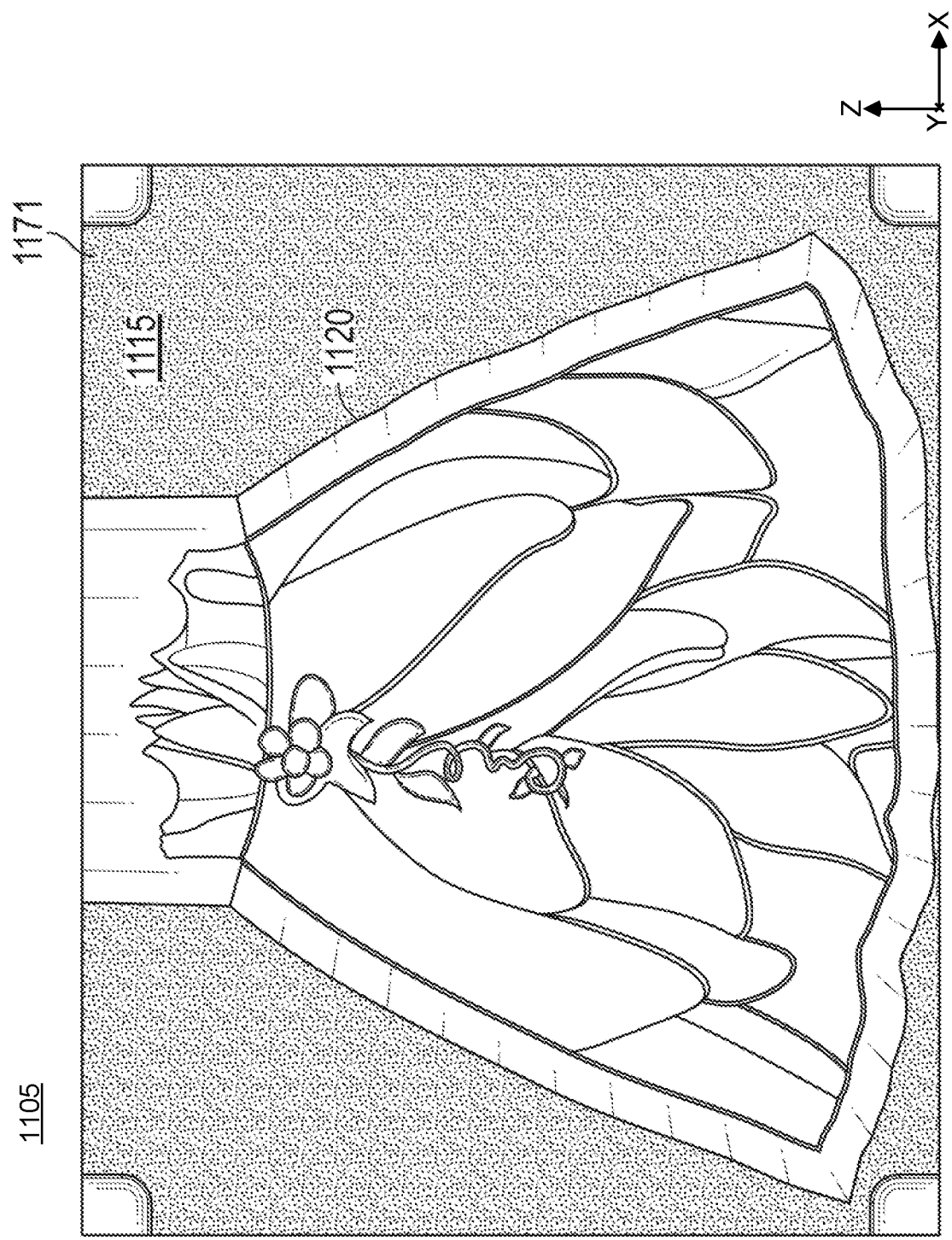
FIGS. 11A and 11B are front and back perspective views of a multilayer composition including fabric applied to the base layer, and after being pressed in the mold.
Figure 11B:
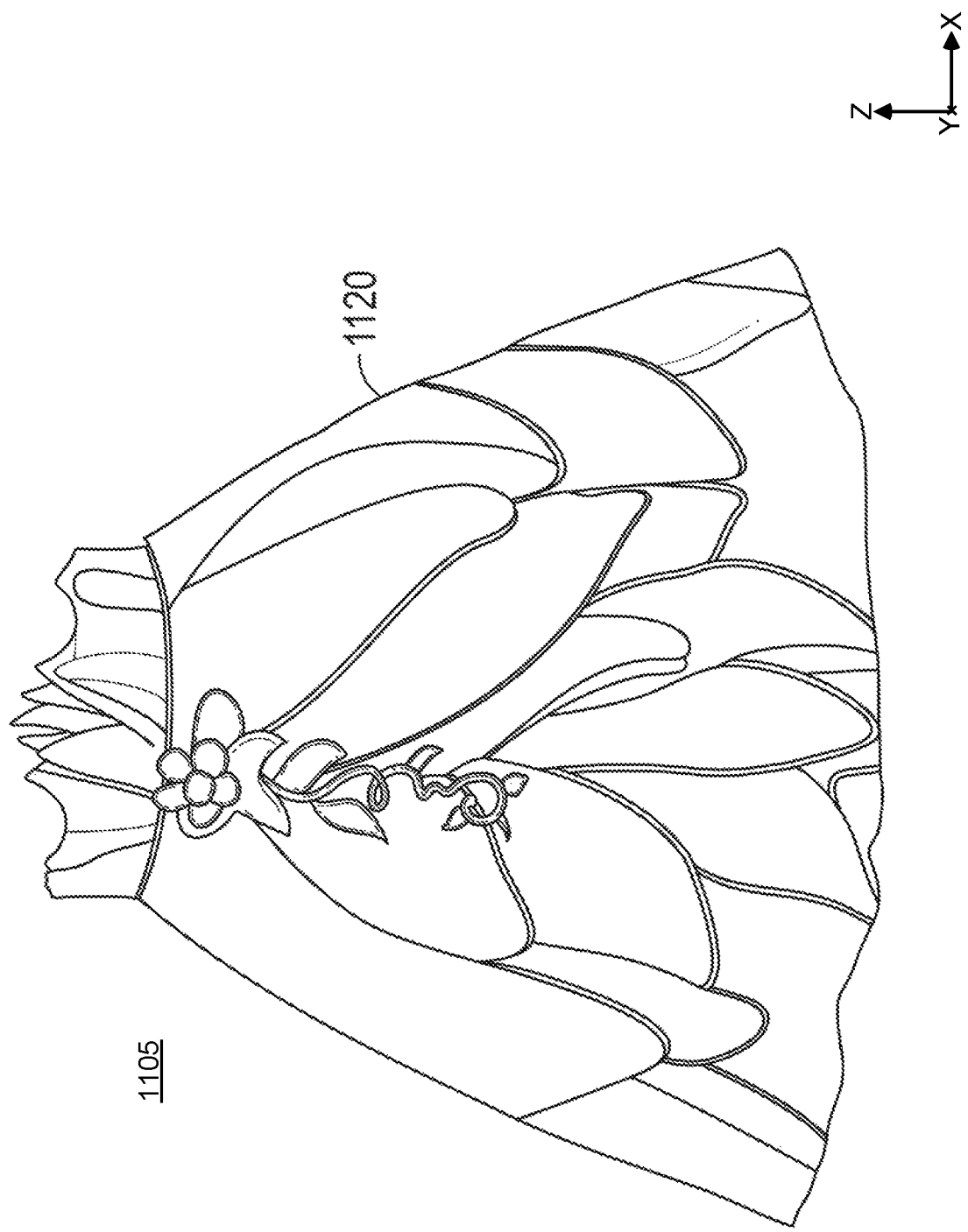
Figure 11C:
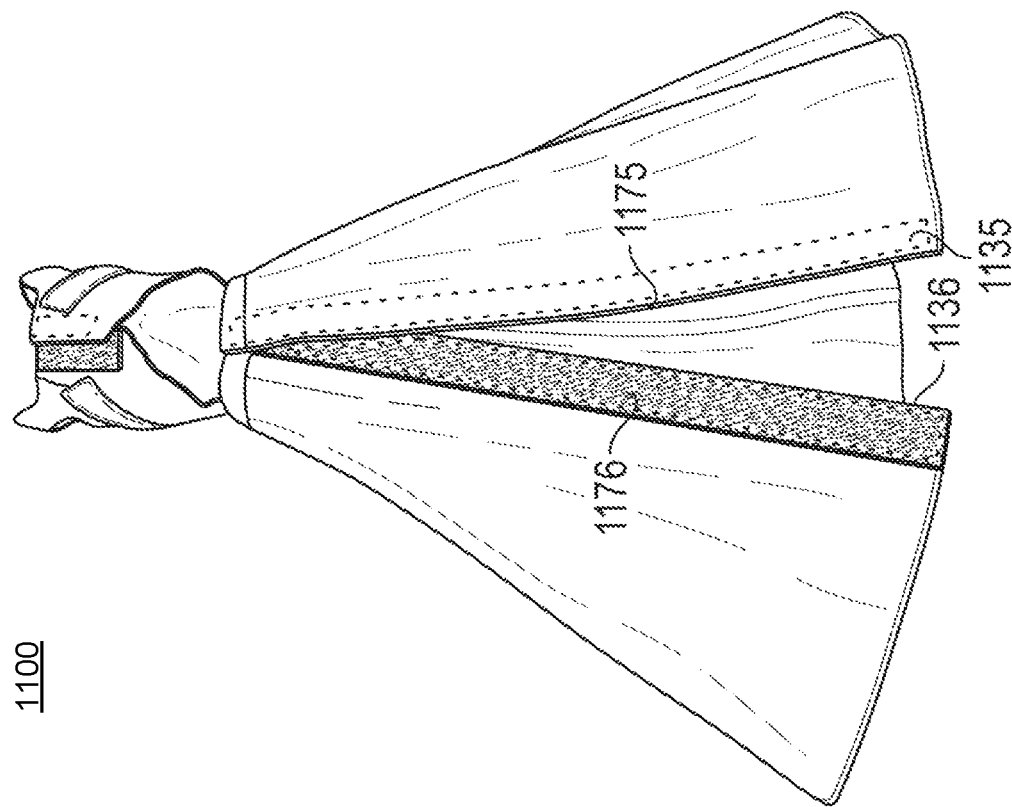
FIG. 11C is a side perspective view of a garment made from the multilayer composition of FIGS. 11A and 11B after being die cut and after mating connection devices have been attached to respective first and second connection regions of the multilayer composition.
Figure 10C:
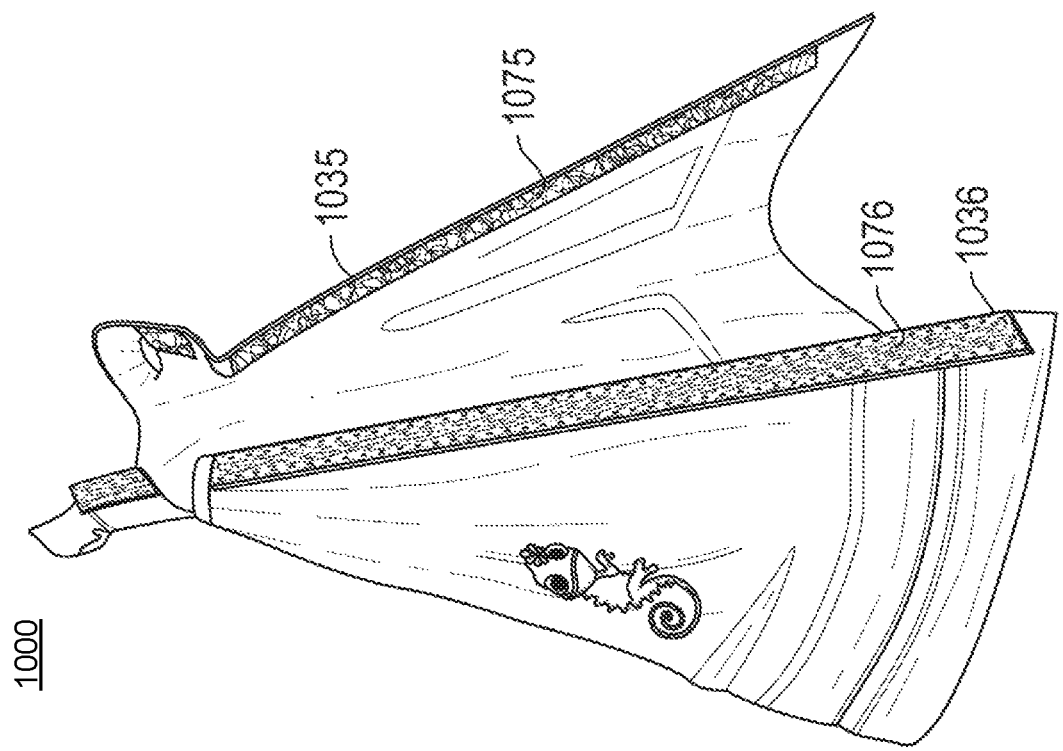
FIG. 10C is a side perspective view of a garment made from the multilayer composition of FIGS. 10A and 10B after being die cut and after mating connection devices have been attached to respective first and second connection regions of the multilayer composition.

As another example, with reference to FIGS. 11A and 11B, a cooled multilayer composition 1105 in which the print material 1120 is formed as a fabric applied to an elastomeric polymer base layer 1115 and has been processed using the procedure 650 is cut (for example, die cut) into the shape of the garment. In this step the die cutting can also separate a portion 1171 of the elastomeric polymer base layer 1115 that lacks any print material 1120. After die-cutting, the multilayer composition 1105 takes the shape of the garment including print material 1120 over the base layer 1115.

The multilayer composition 705 can be further formed into the three-dimensional garment (657) by attaching mating connection devices (such as hook and loop fasteners) to first and second connection regions of the multilayer composition 705. For example, with reference to FIG. 10C, mating connection devices 1075, 1076 (hook and loop fasteners) are attached (for example, by sewing) to respective first and second connection regions 1035, 1036 of the composition 1005. As another example, with reference to FIG. 11C, mating connection devices 1175, 1176 (hook and loop fasteners) are attached (for example, by sewing) to respective first and second connection regions 1135, 1136 of the composition 1105. The respective garment 1000 and 1100 is now formed and can be placed on the toy figure by, for example, wrapping the garment 1000, 1100 around the body of the toy figure and connecting the connection regions so that the garment 1000, 1100 is in the closed state.

Referring again to FIG. 6, as mentioned above, in step 651, the multilayer composition 705 is formed by applying the print material 720 to the base layer 715 (652).

Figure 12A:
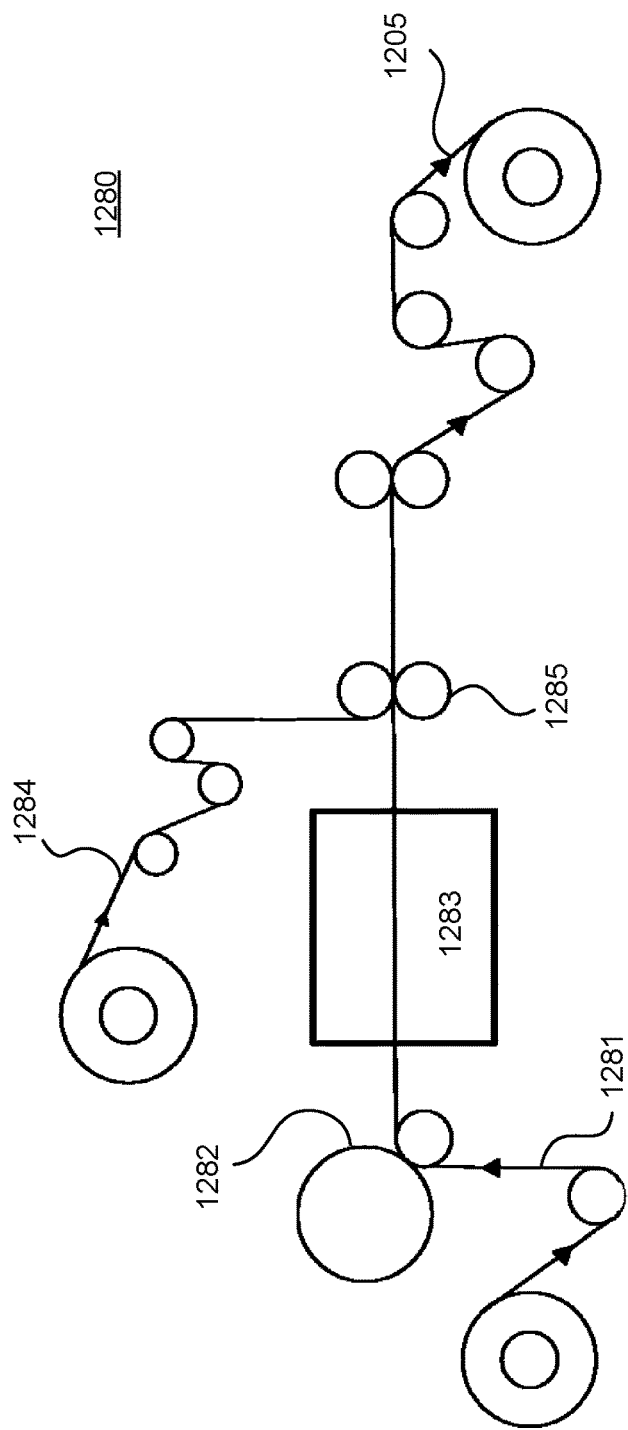
FIG. 12A is a schematic diagram showing a manufacturing process for forming a multilayer composition including fabric as the print material such as the multilayer composition of FIGS. 2A and 2B.
Figure 12B:
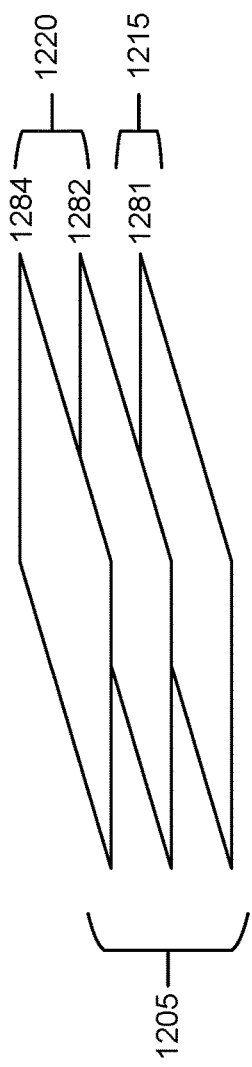
FIG. 12B is a schematic diagram showing the layers of the multilayer composition formed using the manufacturing process of FIG. 12A.

In one implementation in which the print material is a fabric material (such as the fabric material 220 of FIG. 2A), the print material 220 is applied to the base layer 215 according to a procedure 1280 shown in FIG. 12A. In the procedure 1280, a multilayer composition 1205 is formed from applying a fabric 1284 (which includes one or more design elements) to a sheet 1281 of material that is the elastomeric polymer that will form the base layer 1215. Initially, an adhesive 1282 is applied to the sheet 1281, for example, by rolling the adhesive 1282 onto the sheet 1281 as it is conveyed across a roller of the adhesive 1282. The sheet 1281 including the adhesive 1282 is heated in an oven 1283 to a suitable temperature to activate the adhesive 1282 and then the fabric 1284 is pressed onto the adhesive 1282 side of the sheet 1281 by way of a pressure roller 1285 to form the multilayer composition 1205. The print material 1220 therefore includes the fabric 1284 and the adhesive 1282 and this is applied to the base layer 1215 (which is made from the sheet 1281), as shown in FIG. 12B. This multilayer composition 1205 can be stored until it is needed for the next steps in the procedure 660.

Figure 13A:
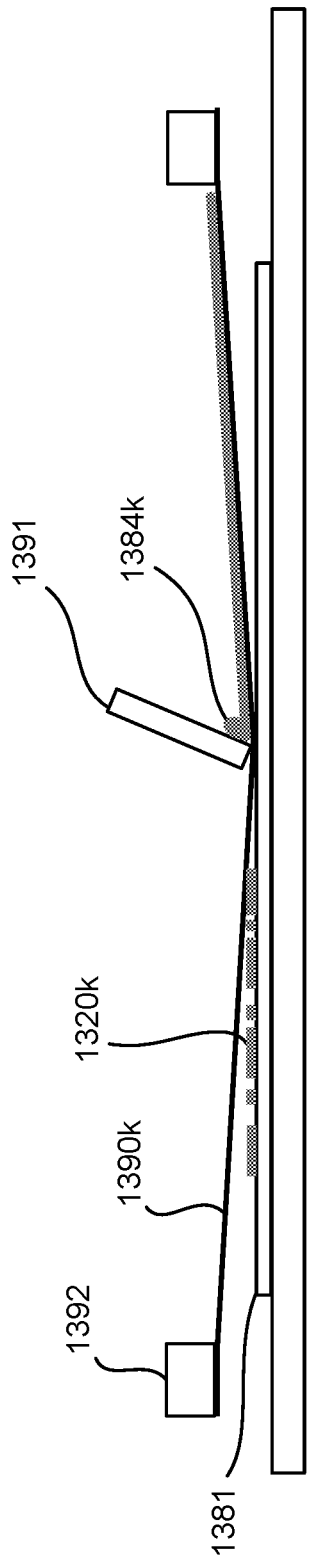
FIG. 13A is a schematic diagram showing a manufacturing process for forming a multilayer composition including ink as the print material such as the multilayer composition of FIGS. 3A and 3B.
Figure 13B:
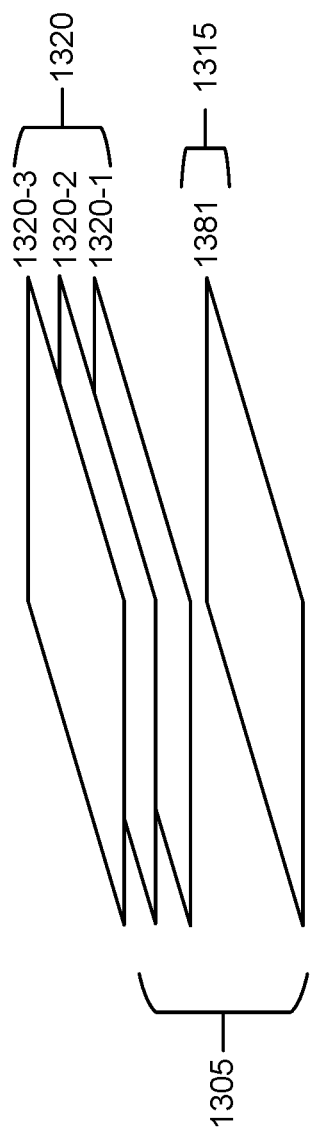
FIG. 13B is a schematic diagram showing the layers of the multilayer composition formed using the manufacturing process of FIG. 13A.

In another implementation in which the print material is and ink (such as the ink 320 of FIG. 3A), the print material 320 is applied to the base layer 315 according to a screen or mesh procedure 1380 shown in FIG. 13A. The procedure 1380 can be a silkscreen procedure in which one or more separate layers of ink 1384$k$ (where k is a positive integer) are applied to the sheet 1381 of elastomeric polymer. Each ink 1384$k$ can be applied according to a geometry or pattern of a screen or mesh 1390$k$, such mesh 1390$k$ including a stencil that is specifically designed for the particular color of the ink 1384$k$. The ink 1384$k$ is pushed through tiny through holes in the mesh by the use of the squeegee 1391 and the mesh 1390$k$ is held taut by being secured to a frame 1392. The ink 1384$k$ that is applied to the sheet 1381 forms a printing material layer 1320$k$. The final printing material 1320 is formed from the one or more layers 1320$k$ of different colors that are applied in succession on top of each other.

As discussed in the implementation above, the reference locations 716 are provided at the base layer 715 at the regions that lack the print material 720. These reference locations 716 are used during the procedure 650 to align the print material 720 with the three-dimensional mold 960. In other implementations, as shown in FIGS. 14A and 14B, one or more reference locations 1416 can be embedded within the print material 1420B, one or more reference locations 1416 can be embedded inside of regions 1417 that lack the print material 1420A, or one or more reference locations 1416 can be placed between disconnected regions 1420A, 1420B of the print material 1420. In this implementation, the print material 1420 is applied to distinct and disconnected regions 1420A, 1420B on the base layer 1415. Thus, in some implementations, it is possible for the print material 120 to be applied in one or more distinct and disconnected regions onto the base layer 115.

In other implementations, the reference locations 716 provided on the multilayer composition 705 can be a geometric protrusion as opposed to an opening or hole in the multilayer composition 705, and the reference location 961A, 961B of each mold component 960A, 960B can be an opening or depression. In this way, the geometric protrusion of the multilayer composition 705 interfits with the opening or depression of the reference location 961A, 961B on each of the mold components 960A, 960B.

What is claimed is:

1. A three-dimensional garment for a toy figure, the three-dimensional garment comprising:
a multilayer composition that is shaped into the three-dimensional garment and is able to stand on its own, the multilayer composition comprising:
an elastomeric polymer base layer comprising a plurality of three-dimensional design features, each three-dimensional design feature extended through the thickness of the elastomeric polymer base layer; and
a print material applied to the elastomeric polymer base layer, wherein the print material comprises one or more printed design elements, each printed design element being aligned with a respective three-dimensional design feature of the elastomeric polymer base layer.

2. The three-dimensional garment of claim 1, wherein the multilayer composition comprises at least two connection regions at distinct locations for connecting the distinct locations to thereby form the three-dimensional garment that is able to stand on its own.

3. The three-dimensional garment of claim 1, wherein the elastomeric polymer base layer comprises a copolymer of ethylene and vinyl acetate.

4. The three-dimensional garment of claim 3, wherein the weight percent of the vinyl acetate is between 10-40% of the total.

5. The three-dimensional garment of claim 1, wherein the elastomeric polymer base layer has a thickness of between 1.5 and 3.0 millimeters (mm) or between 1.5 and 2.5 mm.

6. The three-dimensional garment of claim 1, wherein the elastomeric polymer base layer has a hardness of about 30-45 shore.

7. The three-dimensional garment of claim 1, wherein the multilayer composition is a laminated composition and the print material is a fabric material including the one or more printed design elements and being attached to the elastomeric polymer base layer.

8. The three-dimensional garment of claim 7, wherein a thickness of the fabric material is between 20-35 μm.

9. The three-dimensional garment of claim 1, wherein the print material is ink applied to the elastomeric polymer base layer in accordance with a stencil design.

10. The three-dimensional garment of claim 9, wherein a thickness of the applied ink is between 1-7 μm.

11. The three-dimensional garment of claim 9, wherein the ink includes a plurality of different colors of ink applied to the elastomeric polymer base layer, each ink color applied in accordance with its own stencil design.

12. A toy comprising:
a toy figure; and
three-dimensional garment configured to dress the toy figure, the three-dimensional garment comprising a multilayer composition that is shaped into the three-dimensional garment and is able to stand on its own, the multilayer composition comprising:
an elastomeric polymer base layer comprising a plurality of three-dimensional design features, each three-dimensional design feature extended through the thickness of the elastomeric polymer base layer; and
a print material applied to the elastomeric polymer base layer, wherein the print material comprises one or more printed design elements, each printed design element being aligned with a respective three-dimensional design feature of the elastomeric polymer base layer.

13. The toy of claim 12, wherein the three-dimensional garment is made of a single piece and is configured to wrap around the toy figure.

14. The toy of claim 12, wherein the toy figure comprises a body and one or more appendages extending from the body; and the three-dimensional garment is made of a single piece and is configured to wrap around the body of the toy figure.

15. The toy of claim 12, wherein the toy figure is able to stand under only the support from the three-dimensional garment when the three-dimensional garment is dressed on the toy figure.

16. The toy of claim 12, wherein:
the print material includes a first region that includes a fabric material and being attached to the elastomeric polymer base layer and a second region that includes ink applied to the elastomeric polymer base layer in accordance with a stencil design; and
the one or more printed design elements are in the first region, in the second region, or in both the first region and the second region.

17. A method of manufacturing a three-dimensional garment for a toy figure, the method comprising:
forming a multilayer composition that is shaped into the three-dimensional garment and is able to stand on its own, and forming the multilayer composition comprises:
applying a print material to an elastomeric polymer base layer, wherein the print material comprises one or more printed design elements, each printed design element being aligned with a respective design feature of the elastomeric polymer base layer to form a multilayer composition; and
pressing the multilayer composition to form the three-dimensional garment having a plurality of three-dimensional design features, each three-dimensional design feature extended through the thickness of the elastomeric polymer base layer and the print material.

18. The method of claim 17, wherein applying the print material to the elastomeric polymer base layer comprises applying ink to the elastomeric polymer base layer in accordance with a stencil design.

* * * * *